United States Patent [19]
Macedo et al.

[11] Patent Number: 4,528,011
[45] Date of Patent: Jul. 9, 1985

[54] IMMOBILIZATION OF RADWASTES IN GLASS CONTAINERS AND PRODUCTS FORMED THEREBY

[75] Inventors: Pedro B. Macedo, 6100 Highboro Dr., Bethesda, Md. 20034; Catherine J. Simmons, Bethesda, Md.; Danh C. Tran, Rockville, Md.; Nicholas Lagakos, Silver Spring, Md.; Joseph Simmons, Bethesda, Md.

[73] Assignees: Pedro B. Macedo, Bethesda; Theodore A. Litovitz, Annapolis, both of Md.

[21] Appl. No.: 330,336

[22] Filed: Dec. 14, 1981

Related U.S. Application Data

[60] Division of Ser. No. 034,567, Apr. 30, 1979, Pat. No. 4,312,774, which is a continuation-in-part of Ser. No. 959,220, Nov. 9, 1978, abandoned.

[51] Int. Cl.[3] .......... C01C 21/00
[52] U.S. Cl. .......... 65/30.13; 65/30.14; 252/629
[58] Field of Search .......... 65/30.13, 30.14, 3.14, 65/3.15; 252/629

[56] References Cited

U.S. PATENT DOCUMENTS

| | | | |
|---|---|---|---|
| 2,616,847 | 11/1952 | Ginell | 210/2 |
| 3,364,148 | 1/1968 | Kivel et al. | 252/301.1 |
| 3,938,974 | 2/1976 | Macedo et al. | 65/30.13 |
| 4,110,096 | 8/1978 | Macedo et al. | 65/30.14 |

FOREIGN PATENT DOCUMENTS

| | | | |
|---|---|---|---|
| 53-114926 | 10/1978 | Japan | 65/30.14 |

OTHER PUBLICATIONS

Patrick et al., "Behavior of Silica Gel Towards Certain Alkalies", *J. Phys. Chem.*, vol. 29, (1925), pp. 1400-1405.
Pierce Handbook and General Catalog 1979-1980, Pierce Chemical Co., 1978, pp. 356-379.

*Primary Examiner*—William Smith
*Attorney, Agent, or Firm*—Fleit, Jacobson, Cohn & Price

[57] ABSTRACT

This invention relates to the immobilization of toxic materials, e.g., radioactive materials, in glass for extremely long periods of time. Toxic materials, such as radioactive wastes, which may be in the form of liquids, or solids dissolved or dispersed in liquids or gases, are deposited in a glass container which is heated to evaporate off non-radioactive volatile materials, if present; to decompose salts, such as nitrates, if any, and to drive off volatile non-radioactive decomposition products, and then to collapse the walls of said container on said radwaste and seal the container and immobilize the contained radwaste, and then burying the resulting product underground or at sea. In another embodiment, the glass container also contains glass particles, e.g., spheres or granules, on which the radwaste solids are deposited. In other embodiments, the glass container can be made of porous glass or non-porous glass, and/or the contained glass particles can be made of porous or non-porous glass or mixtures of porous or non-porous glass, and/or the glass container can be open at one end and closed at the other or open at both ends, and/or the glass container can be closed at one end with a porous or non-porous closure and open at the other end or closed at the other end with a porous closure. When a porous glass container and/or porous glass particles are used, the radwaste deposits within the pores of the glass which are closed during the subsequent heating step after non-radioactive volatiles have been driven off and prior to sealing the container. There results a substantially impervious glass article in which the radwaste is entrapped and which is highly resistant to leaching action. The products resulting from the use of porous glass, as the container, contents, or both, can be used as sources of radioactivity for a variety of applications in medicine, sterilization, food preservation and any other application where radiation can be beneficially employed.

11 Claims, No Drawings

IMMOBILIZATION OF RADWASTES IN GLASS CONTAINERS AND PRODUCTS FORMED THEREBY

RELATED APPLICATIONS

This is a division of application Ser. No. 034,567, filed Apr. 30, 1979 now U.S. Pat. No. 4,312,774, issued Jan. 26, 1982, which is a continuation-in-part of application Ser. No. 959,220, filed Nov. 9, 1978, now abandoned.

BACKGROUND OF THE INVENTION

The disposal of large quantities of toxic materials such as high level radioactive wastes stored in spent reactor fuel storage pools, or generated in the reprocessing of spent nuclear power reactor fuel, or generated in the operation and maintenance of nuclear power plants, is a problem of considerable importance to the utilization of nuclear power. It is generally accepted that the most promising approach is to convert these radioactive wastes to a dry solid form which would render such wastes chemically, thermally and radiolytically stable.

The problem of dry solid stability of radioactive wastes is closely related to the safety of human life on earth for a period of more than 20,000 years. For example, radioactive wastes usually contain the isotopes $Sr^{90}$, $Pu^{239}$, and $Cs^{137}$ whose half lives are 28 years, 24,000 years, and 3 years, respectively. These isotopes alone pose a significant threat to life and must be put into a dry, solid form which is stable for thousands of years. The solid radioactive waste form must be able to keep the radioactive isotopes immobilized for this length of time, preferably even in the presence of an aqueous environment. The radioactive wastes are produced in high volumes and contain long-lived, intermediate-lived, and short-lived radioactive ions and some non-radioactive ions. These solutions can be highly corrosive and it is difficult, if not impractical, to reduce them to concentrated forms for further processing or storage.

The two most popular types of commercial reactors both of which produce low level wastes are the Boiling Water Reactor (B.W.R.) and the Pressurized Water Reactor (P.W.R.). In a typical Pressurized Water Reactor (P.W.R.), pressurized light water circulates through the reactor core (heat source) to an external heat sink (steam generator). In the steam generator, where primary and secondary fluids are separated by impervious surfaces to prevent contamination, heat is transferred from the pressurized primary coolant to secondary coolant water to form steam for driving turbines to generate electricity. In a typical Boiling Water Reactor (B.W.R.), light water circulates through the reactor core (heat source) where it boils to form steam that passes to an external heat sink (turbine and condenser). In both reactor types, the primary coolant from the heat sink is purified and recycled to the heat source.

The primary coolant and dissolved impurities are activated by neutron interactions. Materials enter the primary coolant through corrosion of the fuel elements, reactor vessel, piping, and equipment. Activation of these corrosion products adds radioactive nuclides to the primary coolant. Corrosion inhibitors, such as lithium, are added to the reactor water. A chemical shim, boron, is added to the primary coolant of most P.W.R.'s for reactivity control. These chemicals are activated and add radionuclides to the primary coolant. Fission products diffuse or leak from fuel elements and add nuclides to the primary coolant. Radioactive materials from all these sources are transported around the system and appear in other parts of the plant through leaks and vents as well as in the effluent streams from processes used to treat the primary coolant. Gaseous and liquid radioactive wastes (radwaste) are processed within the plant to reduce the radioactive nuclides that will be released to the atmosphere and to bodies of water under controlled and monitored conditions in accordance with federal regulations.

The principal methods or unit operations used in the treatment of liquid radwaste at nuclear power plants are filtration, ion exchange, and evaporation.

Liquid radwastes in a P.W.R. are generally segregated into five categories according to their physical and chemical properties as follows:

a. Clean Waste includes liquids which are primarily controlled releases and leaks from the primary coolant loop and associated equipment. These are liquids of low solids content which are treated in the reactor coolant treatment system.

b. Dirty or Miscellaneous Waste includes liquids which are collected from the containment building, auxiliary building, and chemical laboratory; regeneration solutions from ion-exchange beds; and solutions of high electrical conductivity and high solids content from miscellaneous sources.

c. Steam Generator Blowdown Waste is condensate from the steam that is removed (blowdown) periodically to prevent excessive solids buildup.

d. Turbine Building Drain Waste is leakage from the secondary system that is collected in the turbine building floorsump.

e. Detergent Waste includes liquids from the laundry, personnel decontamination showers, and equipment decontamination.

Liquid radwastes in a B.W.R. are generally segregated into four categories according to their physical and chemical properties as follows:

a. High-Purity Waste includes liquids of low electrical conductivity ($<50$ $\mu$mho/cm) and low solids content, i.e., reactor coolant water that has leaked from the primary reactor system equipment, the drywell floor drain, condensate demineralizer backwash, and other sources of high-quality water.

b. Low-Purity Waste includes liquids of electrical conductivity in excess of 50 $\mu$mho/cm and generally less than 100 $\mu$mho/cm; i.e., primarily water from floor drains.

c. Chemical Waste includes solutions of caustic and sulfuric acid which are used to generate ion exchange resins as well as solutions from laboratory drains and equipment decontamination.

d. Detergent Waste includes liquids from the laundry and personnel decontamination showers.

The liquid radwastes from both types of reactors are highly dilute solutions of radioactive cations, and other dissolved radioactive materials as well as undissolved radioactive particles or finely divided solids.

A practical process for disposing of radioactive materials in a dry solids form having high resistance to leaching and other forms of chemical attack would not only be suitable for the disposal of radioactive nuclear wastes, but also for the fabrication of radioactive sources useful in industry, medicine, and in the laboratory.

Heretofore, there did not exist any practical, foolproof means for the safe disposal, storage and immobilization of pernicious radioactive waste material. Present day storage containers do not provide sufficient isolation and immobilization of such radioactive material, sufficient long-term resistance to chemical attack by the surroundings, and sufficient stability at high temperature.

Currently low level radioactive waste, that is radioactive waste generated at reactor sites, is disposed of in the following manner:

(A) The dead ion exchange resin containing radioactive waste is mixed with cement and cast in forty gallon barrels.

(B) The bottoms from evaporators which contain the radioactive contaminated boric acid and the solutions used to regenerate the ion exchange columns are mixed with cement powder and cast in forty gallon metal or plastic barrels.

(C) The filters containing particulate forms of radioactive waste are usually encased in cement in metal or plastic barrels.

These cement barrels are transported to low level radioactive waste sites and buried six feet deep in the ground. At least one of the sites is in the United States Eastern States and exposed to substantial rainfall. In Europe, these barrels are buried at sea. In both cases water will first corrode the metal then the cement and will relatively quickly expose the radioactive ions for leaching into the ground water or sea water. Because the U.S. burials are only a few feet deep, the contaminated water can readily intermix with streams, lakes and rivers, thus, entering the ecosphere. The rationale for this practice is the assumption that upon sufficient dilution the radioactivity becomes harmless.

Some of the most serious nuclear wastes are cesium and strontium which are biologically similar to sodium and calcium. They have thirty year half lives indicating that they should be isolated from the ecosphere for at least three hundred years (ten half lives). At Bikini, the experts assumed that dilution had made the island inhabitable after decades in which no atomic explosions were performed, yet when the population was returned to the island its health was deleteriously effected. It has since been realized that plants and animal life biologically reconcentrate these radioactive elements back up to dangerous levels.

Thus, the "safe" concentration of radioactive waste must be much lower than accepted values and a more durable substitute for cement is needed. The present invention presents a safe alternative to the cement-solidification of low level waste.

Another route heretofore suggested is the so-called dry solids approach which involves the fixation of the waste materials in glasses via mixing with glass-forming compositions and melting to form glasses. This approach offers some improvement regarding isolation and decrease in the rate of release of radioactive elements when the outer envelopes or containers are destroyed. Further, such glasses remain relatively more stable at high temperatures than plastic and are generally more chemically durable in saline solutions than are metals. Glasses with high chemical durability and low alkali ion conductivity suitable for this prior art technique are formed at very high temperatures, e.g., 1800° C. and higher. Prior processes utilizing such high melting glass-forming compositions are economically unsound and moreover, cause a dangerous problem due to the risk of volatilization of pernicious radioactive materials. Furthermore, this prior procedure is restricted to dry solid radioactive wastes and provides no solution to the high volumes of liquid radioactive wastes produced by the operation and maintenance of nuclear reactors, by the current practice of storing spent fuels in pools of water, and by spent reactor fuel recovery systems.

In view of the overall difficulties of handling radioactive material, and especially in view of the danger of volatilization of radioactive material into the atmosphere, attention has been directed to using glass compositions having relatively low melting temperatures, that is to say, using glass compositions with $SiO_2$ contents as low as 27 weight percent. While the problem of volatilization of radioactive materials is reduced, it is not completely controlled. Moreover, the resultant glass composition exhibits greatly reduced chemical durability and increased ion diffusion rates for the radioactive materials present therein. The greater this diffusion rate, the lower is the ability of the glass to keep the radioactive materials immobilized in its matrix. For long-term containment of radioactive waste, demanded under present day standard, these prior glass compositions are inadequate.

U.S. Pat. No. 3,640,888 teaches the production of neutron sources by encapsulating californium-252 in glass using the steps of packing an open-ended vitreous tube with a porous powder of quartz having an organic liquid ion exchange material sorbed thereon, passing an aqueous solution containing californium-252 cations through the powdered quartz, drying and heating the powdered quartz and tube in air to oxidize and volatilize the organic liquid ion exchange material resulting in the non-volatile oxide of californium-252, and then fusing the tip and powder contents to form a vitreous body containing the californium-252 oxide. The patent, however, does not disclose, teach or suggest the use of porous glass as the tube, in packing for the tube or in a stopper for the tube nor does it disclose or suggest any method or technique for concentrating and safely disposing of radioactive wastes as by burying in strong, durable, leach-resistant glass containers.

U.S. Pat. No. 1,533,794 teaches the packaging of radium emanations in a glass capillary tube followed by sealing the ends of the tube and thus enclose emanations previously introduced into the tube. There is no teaching, however, of any method for concentrating and encapsulating radwaste.

U.S. Pat. Nos. 2,336,227; 2,340,013; 2,522,524; 3,364,148 and 4,073,579 relate to the treatment of porous glass with non-radioactive ions (radioactive ions in the case of U.S. Pat. No. 3,364,148) followed by heating to close the pores which contain the ions. U.S. Pat. No. 3,147,225 discloses refractory particles, which contain no or minor amounts of silica and preferably are crystalline, within which particles a specifically selected radioactive cation is firmly fixed for use in self-luminous markers, liquid level indicators and other applications.

U.S. Pat. No. 3,116,131 discloses the method of binding expanded silica particles with a binder and shaping and curing into a desired form, followed by impregnation with a solid dessicant, e.g., sodium hydroxide, and followed by impregnation with a radioactive gas and steam to absorb the water vapor followed by capillary condensation thereby entraining the radioactive gas in the pores after which the pores are closed by heating.

U.S. Pat. No. 3,959,172 discloses the method of forming and reacting a mixture of silicate or other source of silicon, a radionuclide waste and a metal cation to produce complex metalosilicate crystals which entrap the radionuclide waste. U.S. Pat. Nos. 3,451,940 and 3,849,330 disclose the utilization of a thermite reaction to form a complex polysilicate product containing the radioactive wastes.

U.S. Pat. No. 3,167,504 discloses the purification of radioactive waste liquid by absorption on a synthetic zeolite which is then sealed in a suitable container for burial.

U.S. Pat. Nos. 3,114,716; 3,262,885; 3,365,578 and 4,020,004 each deal with various techniques involving the preparation of glass-forming mixtures followed by firing to form a glass.

U.S. Pat. No. 3,093,593 discloses methods for disposing of radioactive wastes by forming porous ceramic pieces from clays and other silicates followed by prefiring such pieces to destroy ion exchange capacity and thereafter impregnating the prefired pieces with radioactive liquid wastes. The pieces saturated with radioactive waste are then heated to vitrify them and render them non-absorptive.

U.S. Pat. No. 3,938,974 relates to glass, optical wave guide fibers and their production. Radioactive materials cannot be used in such fibers because they form color centers which absorb light. Not only does this patent fail to disclose the use of radioactive materials, the presence of such materials are inimical to the express objects of the patent.

There is no disclosure or suggestion in any of the above-identified patents of radwaste disposal methods involving the depositing of radwaste solids in a glass container, and heating to drive off non-radioactive volatile materials, e.g., water and decomposition products, while preventing the escape of radioactive materials and to collapse the container and seal it, thereby providing a durable, highly leach-resistant, long-term containment of radioactive solids.

As will be apparent hereinafter from the various aspects of applicants' contributions to the art, there are provided novel methods providing novel articles for the containment of pernicious and dangerous radioactive materials over extraordinarily long periods of time. Unlike melting glass containment procedures, the methods of the present invention provide for the control of radioactive materials that are prone to volatilization at high temperatures employed in the containment procedure, thereby providing for elimination of environmental hazards due to the possible escape of volatilized radioactive material in the atmosphere and avoiding the necessity of providing elaborate recapture and/or redisposal procedures and equipment.

SUMMARY OF THE INVENTION

The invention broadly relates to the concentration and immobilization of toxic solids, such as, mercury, cadmium, tellurium, lead, insecticides and poisons, and especially radioactive materials and the like for extremely long periods of time.

The invention more specifically contemplates novel glass articles containing said toxic solids and having high mechanical strength and high chemical durability to aqueous corrosion and having sufficiently low radioisotope diffusion coefficient values to provide protection to the environment from the release of radioactive material such as radioactive isotopes, nuclear waste materials, etc., and which are concentrated, immobilized and encapsulated therein and are suitable for burial underground or at sea. The glass articles are made by depositing the radioactive solids in a glass container followed by heating the container to drive off non-radioactive volatiles and to drive off non-radioactive decomposition products. The glass container may be made of porous glass and may or may not contain a porous or non-porous glass packing which can preferably be particulate or can be relatively large as a single or few glass rods. The glass articles of this invention have a composition characterized by a radiation activity illustratively above one millicurie, preferably greater than one curie, per cubic centimeter of said article. (When highly dilute radwastes are treated pursuant to this invention for the purpose of concentrating and immobilizing the radwaste for storage, the radiation activity of the resulting glass articles may not reach the level of one millicurie per cubic centimeter of the glass article and may remain below 1 microcurie per cc., when it becomes expedient for other reasons to collapse and seal the glass container. In concentrating and immobilizing radioactive materials in dilute radwastes, the glass container can be loaded up to 10 microcuries per cc. or more but usually is loaded up to 1 microcurie per cc. of said glass article). The radioactive material is in the form of radioactive solids that are sealed within the glass container. In one aspect, the amount of radioactive material contained in the glass article is at least 1 ppb (part per billion based on weight), generally in solid form of at least five and preferably at least ten of the radioactive elements listed hereinafter. Preferably the novel glass articles should contain at least 75 mole percent $SiO_2$, most preferably greater than 89 mole percent $SiO_2$.

From a practical standpoint, the upper limit of radioactive material contained in the glass articles will be governed, to a degree, by such factors as: the concentration, form and type of radioactive material encapsulated in the glass article, by the volume fraction of pores, if any, in the glass container, by the amount, if any, of glass packing in the glass container, by the various techniques employed to encapsulate the radioactive material in the glass container and other factors.

Radioactive materials which can be concentrated, encapsulated and immobilized in the glass container pursuant to this invention include radioactive elements (naturally occurring isotopes and man-made isotopes existing as liquids or solids dissolved or dispersed in liquids or gases), in combined or uncombined form (i.e., as anions, cations, molecular or nonionic, or elemental form) such as rubidium, strontium, the lanthanides, e.g., La, Ce, Pr, Nd, Pm, Sm, Eu, Gd, Tb, Dy, Ho, Er, Tm, Yb, Lu, cobalt, cadmium, silver, zirconium, molybdenum, technetium, niobium, ruthenium, rhodium, palladium, tellurium, cesium, barium, francium, yttrium, radium and acinides, e.g., Ac, Th, Pa, U, Np, Pu, Am, Cm, Bk, Cf, Es cations and elements. Especially suitable in the practice of the invention are radioactive wastes from nuclear reactors, spent reactor fuel reprocessing, spent fuel storage pools or other radioactive waste producing processes. The glass in the final glass product can be vitreous throughout or partly vitreous and partly crystalline.

The invention can be practiced in many ways. Illustratively, one facile yet highly effective way is to deposit the radioactive materials, e.g., radioactive nitrates, as a solid in a non-porous glass container, such as a glass tube, having at least one opening, and then followed by heating the container to drive off water and/or other non-radioactive volatiles, if present, and then to collapse the walls of the tube and seal it around the deposited radioactive solids. The heating step can be carried out in such manner that solids, such as nitrates, deposited in the tube decompose to provide non-radioactive gases, such as nitrogen oxides, which are removed from the glass tube before sealing.

Alternatively, a non-porous glass container can be closed at one end and at least partially filled with a packing such as porous glass particles, such as, porous glass powder, or tiny glass spheres or silica gel in particulate or other form. The fluid containing radioactive material is then poured into the container to fill the interstices between the glass particles followed by heating to drive off non-radioactive volatiles with or without decomposition of components, such as nitrates, in the fluids and ultimately to seal the glass container around the radioactive solids deposited on the glass particles and in the pores of porous glass particles, if present, contained by the container. In this instance the contained glass particles provide surfaces on which the solids can be deposited and also act to control the volatilization to prevent eruption of fluid out of the tube during the heating step. The porous glass particles provide additional interior surfaces within the pores of the particles for deposit of additional dissolved solids in the fluid as well as external surfaces for deposit of dispersed solids.

In another embodiment a non-porous glass container having open upper and lower ends can be filled with porous or non-porous glass particles which are held in the glass container by means of a porous structure, such as glass wool or a porous glass disc or rod in the lower portion of the container to support the glass particles in the container. The fluid containing dissolved and/or dispersed radioactive solids is then poured into the upper or lower end of the container and passes through the bed of glass particles which act as a filter to remove dispersed radioactive solids from the fluid. The glass particle bed can contain glass particles having silicon-bonded cation exchange groups, such as, alkali metal oxide or ammonium oxide groups as described in U.S. Ser. No. 959,222, filed Nov. 9, 1978, now abandoned, the disclosure of which is incorporated herein by reference. Ser. No. 39,595 filed May 16, 1979 now abandoned, is a continuation-in-part of Ser. No. 959,222. Ser. No. 370,437 filed Apr. 21, 1982 is a continuation of Ser. No. 39,595. The porous cation exchange glass particles remove dissolved radioactive cations from the fluid. The fluid can be passed through one or more such beds using conventional techniques for multibed filtration and/or ion exchange until the fluid has been cleansed of radioactivity to the desired level. When the filtration-ion exchange glass particles become loaded or when, for some other reason, it is no longer desired to further utilize them, the beds and the container containing them can be heated to drive off water and/or other non-radioactive volatiles or gases such as decomposition products, e.g., nitrogen oxides, and then to collapse the pores of the porous glass particles containing the radioactive cations, to fuse the glass particles together thus entrapping radioactive solids and/or cations deposited on the inner and outer surfaces of the particles, and then to collapse the glass container and seal it around all of its contents to encapsulate the entire mass into a substantially solid leach-resistant structure suitable for long-term storage.

In still another embodiment the glass container itself can be made of porous glass and the radioactive fluid is introduced into the interior of the container and caused to permeate through the pores of the glass from the interior walls to the outer walls of the glass container. The insoluble radioactive solids originally dispersed in the fluid are deposited on the interior wall of the container and the dissolved radioactive solids are disposed in the pores of the glass container where they can be deposited by various techniques, such as those taught in U.S. Pat. No. 4,110,096. The glass container can then be heated to drive off volatiles as described above, to collapse the pores of the glass container and ultimately to collapse the glass container and seal it thereby encapsulating the radioactive solids within the glass structure. Prior to heating, the outer wall surfaces of the container can be washed to remove deposited radioactive solids from the outer surface layer of the glass container so that ultimately a radioactive-free outer clad is provided after heating to collapse the pores and the container.

The non-porous glass compositions when used herein for the glass container and/or for the glass packing within the container are of any suitable type, but preferably are strong, durable, leach-resistant and chemical-resistant. Any glass composition having these properties can be used such as high silica glasses, for example, Vycor and Pyrex. Suitable glasses contain at least about 70%, preferably at least about 80%, most preferably at least about 93% silica.

The literature adequately describes the preparation of the porous silicate glass compositions. Suitable glass compositions which may be utilized as porous glass compositions in the novel methods generally contain $SiO_2$ as a major component, have a large surface area. In the practice of various embodiments of the invention the $SiO_2$ content of the porous glass or silica gel desirably is at least about 75 mole percent $SiO_2$, preferably at least about 82 mole percent $SiO_2$, and most preferably at least about 89 mole percent $SiO_2$. Such glasses are described in the literature, see U.S. Pat. Nos. 2,106,744; 2,215,036; 2,221,709; 2,272,342; 2,326,059; 2,336,227; 2,340,013; 4,110,093 and 4,110,096, for example. The disclosures of the last two mentioned patents are incorporated herein by reference.

The porous silicate glass compositions can also be prepared in the manner described in U.S. Pat. No. 3,147,225 by forming silicate glass frit particles, dropping them through a radiant heating zone wherein they become fluid while free falling and assume a generally spherical shape due to surface tension forces and thereafter cooling them to retain their glassy nature and spherical shape.

In general, the porous silicate glass can be made by melting an alkali-borosilicate glass, phase-separating it into two interconnected glass phases and leaching one of the phases, i.e., the boron oxide and alkali metal oxide phase, to leave behind a porous skeleton comprised mainly of the remaining high silicate glass phase. The principal property of the porous glass is that when formed it contains a large inner surface area covered by silicon-bonded hydroxyl groups. We prefer to use porous glass made by phase-separation and leaching because it can be made with a high surface area per unit volume and has small pore sizes to give a high concentration of silicon-bonded hydroxyl surface groups, and because the process of leaching to form the pores leaves residues of hydrolyzed silica groups in the pores thus increasing the number of silicon-bonded hydroxyl surface groups present. The porous silicate glass when used as packing may be in the form of powder as for use in chromatography columns or in a predetermined shape such as plates, spheres or cylinders.

It is preferable to utilize a glass composition in the container which will produce a clad or envelope that is low in leachable components, such as, alkali metals or boron. In the event that this is not possible or practical it is preferred to then insert the glass container before or after collapse into a second glass container which has a composition containing no or low amounts of alkali metals or boron or other leachable components. The absence of substantial amounts of leachable components in the outer glass clad obviously provides a more durable and leach-resistant product which is more suitable for burial. In those instances where a glass packing is used in the container, it is preferred that the composition thereof contain little or no leachable components, especially when the resulting products are intended for burial. It is most preferred, that very high silica glasses are employed in both the glass container and the glass packing.

When it is desired to avoid cracking of the glass container in the case where a glass packing, such as glass particles, spheres or a glass rod, are disposed within the glass container, it is preferred to utilize, as the container glass, a glass, which, after the deposition step, has a glass transition temperature of up to 100° C. higher than the glass transition temperature of the glass formed from the glass packing and solids deposited in and on the glass packing. It is also preferred for this purpose to utilize as the glass container a glass which, after the deposition step, has a thermal expansion coefficient which is up to about two times $10^{-6}$ per degree Centigrade less than the thermal expansion coefficient of the glass resulting from sintering of the glass packing and solids deposited in or on said glass packing. In determining, the glass transition temperatures and thermal expansion coefficients, the amount and type of solids deposited in the pores of the glass container, when a porous one is used, and of solids deposited in the pores and on the outer surfaces of porous glass packing when used and of solids deposited on the outer surfaces of non-porous glass packing, when used, can have a considerable effect on the glass transition temperatures and thermal expansion coefficients and should be taken into consideration. It is also preferred to regulate the cooling of the composite glass container and contents, resulting from the depositions and sintering step, such that the rate of cooling is as nearly the same as possible throughout the composite glass container and contents. While cracking has been observed in certain instances, it has not prevented the achievement of the objects of this invention, namely, the immobilization and isolation from the environment of radioactive solids from radioactive wastes containing such solids in dissolved and undissolved form.

DETAILED DESCRIPTION OF THE INVENTION

In one method of the present invention, a radioactive material is deposited as a solid in a hollow glass container having at least one opening. The radioactive material is deposited from a fluid which passes continuously through the glass container or which is placed batch-wise into the container. The fluid may contain dissolved radioactive materials, particulate radioactive materials, or both types of radioactive materials. The fluid may either be a gas or a liquid or both. The radioactive materials, whether particulate or dissolved in the fluid to be treated, can be deposited on a non-porous glass or on a porous glass having an interconnected porous structure. When a porous glass is used, the pores are usually smaller than particulate radioactive materials in the fluid thereby preventing passage of the particulates into the interconnected pores. In this case, the particulates are deposited on the inner wall surfaces of the porous glass container. Radioactive materials which are dissolved in the fluid or which are gaseous radioactive materials, pass into the pores of the glass and are entrapped within the porous structure by either reacting with the glass, undergoing a cation exchange reaction with the glass, or by precipitating within the pores of the glass. Whether a porous glass or a non-porous glass is used, after the radioactive material is deposited in the hollow glass container, the deposited radioactive materials are sealed within the glass matrix by collapsing the walls of the container. Collapse of the walls of the container is achieved by heating the container while: (a) applying a vacuum to the inside of the container, (b) applying external pressure to the container, for example by placing a weight on the container or by increasing the gas pressure outside of the container, and (c) by combinations of methods (a) and (b). Where radioactive material is deposited in the pores of a porous glass, the container is heated to collapse the pores prior to collapse of the walls of the container.

The glass container is hollow and has at least one opening. The most preferred container for processing liquids is one in a shape of a test tube. Where the container has more than one opening, as in the case of a hollow glass rod (or a tube) one or more of the openings may be plugged with a glass stopper to prevent the fluid from escaping during filling in a batch operation. For continuous operation, a glass tube having an opening at each end is preferred. In the latter case, both openings may be plugged with a porous glass stopper. The greater the volume of the fluid to be treated, the more preferable the continuous operation becomes. Examples of other configurations of the glass container which are suitable for the purpose of the present invention are U-shaped, beaker-shaped, box-shaped, etc.

The simplest embodiment of the present invention merely involves deposition of the radioactive materials in a non-porous glass container followed by collapse of the walls of the container and burying the resulting glass article underground or at sea. For example, the glass container can be test-tube shaped and made of a non-porous glass such as a Vycor glass (trademark for a heat and chemical resistant, low thermal expansivity glass of Corning Glass Works). In another embodiment of the present invention, the radioactive material is deposited in a porous glass container. In still another embodiment, the radioactive material can be deposited in a non-porous glass container having a second glass, e.g., a glass packing, disposed within the container. In yet another embodiment of the present invention, the radioactive material is deposited in a porous glass container having a second glass or glass packing disposed within it. In the last two mentioned embodiments, the second glass may be a non-porous glass or a porous glass. The second glass, whether porous or non-porous, may be a glass preform of any suitable shape (e.g., rod shaped, rectangular shaped, particulate, spheroid, etc.) for fitting into and at least partially filling the glass container. The second glass, however, is preferably in the form of particles such as spheres. A preferred embodiment of the present invention utilizes a non-porous glass tube having porous glass particles therein.

Nuclear Waste In A Non-Porous Tube

A non-porous hollow glass container made of Vycor or silicate glass is at least partially filled with a fluid containing radioactive materials. The container preferably has one opening therein which is plugged with a porous-glass plug. In the case where the fluid is a liquid, e.g., water, the glass container is then heated to evaporate the fluid to dryness so as to precipitate the radioactive materials on the inside walls of the glass container. Temperatures slightly above the boiling point to about 50° C. above the boiling point of the fluid can be used. Lower temperatures can be used to dry the fluid when a vacuum is applied to the interior of the glass container. The glass container is further heated and at about 400° C. the radioactive salts originally in the nuclear waste, e.g., the radioactive metal nitrates decompose or are calcined to form the corresponding oxides, e.g., the radioactive metal oxides. The non-radioactive gaseous decomposition products, e.g., nitrogen oxides are driven off by the heating and the porous plug acts as a barrier to keep the nuclear waste from leaving the glass container. The glass container is further heated until it collapses to trap the precipitated, crystalline nuclear waste within the sealed container. Before adding the fluid to the glass container, silica and alumina can be added to the fluid to create a calcined material upon heating. Calcining of nuclear waste materials in metallic containers is well known. The procedures and operating conditions utilized in calcining in a metallic container are also applicable when calcining in the glass containers of the present invention and such teachings are incorporated herein by reference. The glass tube typically collapses at around 1300° C. Further details on the drying procedure, the trapping of radioactive decomposition products, and collapsing of the glass container are presented below.

Nuclear Waste In A Porous Glass Container

Fabrication of the porous glass container used in the process of the present invention may follow any of the available methods used by one practiced in the art to form porous glass in any desired shape, such as cylindrical or rectangular. It preferably has a composition containing more than 75% silica. We prefer to form the porous glass according to the methods disclosed in U.S. Pat. No. 4,110,096, the disclosure of which is incorporated herein by reference. For example, a glass composition containing silica, boron trioxide and two alkali metal oxides (such as $Na_2O$ and $K_2O$) is melted and drawn into long rods or tubes. By suitable heat-treatment, these rods or tubes are phase-separated into two phases; one phase, a silica-rich phase containing also small amounts of $B_2O_3$ and alkali metal oxide and a silica-poor phase which contains greater amounts of $B_2O_3$ and alkali metal oxide. The heat-treated rods or tubes are then immersed in a suitable leaching solution in order to dissolve and remove the phase containing the lower silica concentration. Removal of this phase and subsequent washing yields a porous glass characterized by a $SiO_2$ content greater than 90 mole percent which is ready for use as the glass container for the encapsulation of the dissolved or gaseous radioactive material pursuant to this invention.

The invention is further described with reference to a hollow porous glass container which is test-tube shaped. A solution containing dissolved radioactive materials and particulate radioactive materials such as metallic precipitates of the platinum metal family which are typically present in nuclear waste solutions from spent nuclear fuel reprocessing stations is poured into a porous glass test tube. The solution impregnates the walls of the tube and in this way disposes dissolved radioactive material in the form of dopant within the walls of the porous glass test tube. On the other hand, the particulate radioactive material because of their particle size do not go into the walls of the glass container but instead are deposited on the inner wall of the tube by settling, or filtration. Deposition upon the inner walls of the tube occurs by filtration and by subsequent evaporation of the fluid.

The radioactive material that was originally in solution on the other hand, is disposed inside the pores of the glass tube in solution, as a nitrate for example. The opening in the tube then can preferably be plugged with a porous or non-porous plug. Then, the dissolved radioactive material is deposited in the pores by precipitation out of solution by methods such as those disclosed in U.S. Pat. No. 4,110,096. Thus, the precipitation may be caused by cooling the glass container (thermal precipitation), by chemical precipitation and combinations thereof. Chemical precipitation includes precipitation by the common ion effect to reduce solubilities, and cause precipitation, of the dissolved radioactive materials. It also includes the exchange-of-solvents technique for reducing solubilities to cause precipitation. In this method, the porous glass test tube can be immersed in a solvent in which the soluble radioactive material in the pores is less soluble. The addition of a suitable precipitant which reacts with the dopant, or dissolved radioactive materials, in the pores or causes a suitable change in pH, is also a means of chemical precipitation. Precipitation can also be caused by evaporation of the fluid from the pores, preferably under vacuum and at temperatures around room temperature or below. Precipitation methods other than that involving the evaporation of solvent as the sole means of precipitation are used when it is desired to obtain higher strength glasses consistently. Combinations of precipitation techniques can be used. A preferred combination of precipitation techniques is thermal precipitation and precipitation by exchange of solvents.

Deposition of the dissolved radioactive materials within the pores can also be accomplished by a cation exchange reaction with the glass. Manufacture of suitable glasses for the cation exchange reaction together with a detailed description of the cation exchange process are disclosed in the above-identified concurrently filed application entitled: "Fixation By Ion Exchange Of Toxic Materials In A Glass Matrix", herein incorporated by reference. A porous glass container having cation exchange capabilities is particularly suited to a continuous process. The solution is passed into the interior of the container, through the porous walls for the cation exchange and entrapment of the dissolved radioactive material, and then the remainder of the solution, i.e., the solvent such as water, passes out through the exterior wall of the container.

Subsequent to the deposition step, the outer wall of the porous glass tube can be washed so that the precipitated radioactive material disposed within the pores of the outer surface layers of the porous tube is removed. The washing step is preferred when it is desired to produce a radioactive article free of, or has a lower amount of, radioactive material in its outer surface layers and is not essential in the broad sense of this invention. The solvent of the solution is then removed preferably without migration of the radioactive material within the pores. This can be accomplished by the drying procedure described in U.S. Pat. No. 4,110,096. Typically, the porous glass container is placed in a drying oven and heated to an upper drying temperature under a vacuum at a rate less than 100° C./hour. Preferably, the heating rate is below 30° C./hour because a slow heating rate significantly lowers the cracking probability and avoids redistribution of chemically unbound dopant, although cracking of the glass tube or dopant redistribution is not intolerable in all cases. However, in some circumstances it is desirable to use a higher heating rate to increase throughput of articles through the processing system. A preferred heating rate is about 15° C. per hour.

After the tube is dried, two forms of deposited radioactive materials are obtained: (1) the originally undissolved particulates which are disposed in the interior space defined by the inner walls of glass tube, and (2) the originally dissolved materials which are deposited in the pores of the walls of the glass tube.

Following the drying step, continued heating of the glass container causes decomposition of the radioactive materials both deposited in the pores and outside of the pores. For example, the radioactive material goes from its nitrate form (or whatever its original form was) to its oxide or phosphate or silicate form with nitrogen oxide decomposition products being driven off. It it is desired to encapsulate radioactive gases, e.g., krypton or iodine, these can be introduced into the pores of the porous glass at a temperature typically chosen to be in the range between 50° to 150° C. below the glass transition temperature, $T_g$, of the glass tube including the deposited materials. A narrower range from 75° to 125° C. below the glass transition temperature is preferred.

The heating is continued until the pores of the porous glass collapse. Upon collapse of the pores, the radioactive material which was deposited from solution and including radioactive gases are totally trapped within the matrix of the glass. It is chemically bonded to the glass and physically enclosed within the glass. The heating can be continued without great risk of losing the radioactive material within the glass by vaporization because it is now buried inside the glass itself. While continuing to heat the tube, a small imposed pressure difference between the inside of the tube and the outside of the tube can be used to collapse the tube. The pressure inside the tube is made a little lower than the pressure outside of the tube (by means of a vacuum) for progressively collapsing the tube into a rod. External pressure from a weight placed upon the tube for example, can also be used to collapse the walls of the container. Upon collapse of the tube (or other glass container) the radioactive material which was originally particulate in nature is trapped inside the resulting sealed glass vessel. The originally undissolved particulate radioactive material which is now trapped within the glass vessel can be in the elemental form of a metal, a metal salt, metal oxide or other metal forms. The particulate radioactive material which decomposes as described below, would be in the oxide, phosphate, or silicate form. The collapsed tube is in rod form wherein two kinds of radioactive material are trapped: (1) one which was originally soluble in the solution and which eventually became chemically attached to or entrapped within the glass, and (2) an insoluble, solid radioactive material which eventually became encapsulated by the glass. Thus, upon collapse of the hollow glass article, a glass article is obtained which comprises originally undissolved solid radioactive materials entrapped in its core. The originally dissolved radioactive materials are entrapped and immobilized in the glass matrix surrounding the core.

Utilization of a hollow, porous glass container, particularly one which is tube-shaped, permits several advantages over use of a porous glass rod. For example, one advantage of a porous glass test tube-shaped container is that two surfaces (an inner wall and an outer wall surface) are utilized. The solution which contains the nuclear waste is placed inside the tube to trap the particulate radioactive materials and permeate the pores with the solution containing dissolved radioactive materials. A solution which will cause dissolved radioactive material to precipitate within the pores can be introduced through the outside surface of the porous tube. For example, potassium silicate reacts with many of the nuclear wastes (e.g., iron). The high pH caused by the potassium silicate causes precipitation (e.g., iron oxide) within the pores. In the case of ruthenium, ruthenium silicate precipitates and so forth. By bringing in the material from the outer surface of the porous tube, control of the precipitation of the nuclear waste inside the pores of the porous glass is enhanced.

A further advantage of the tube configuration is that dissolved radioactive materials which do not precipitate during the precipitation step can be sucked to the inner wall of the tube. Thus, the tube is filled completely with the fluid containing the radioactive material. It is then placed in clean water or a second solution and a vacuum is applied to the inside of the tube. In so doing, some dissolved radioactive material may not be precipitated by a decrease in temperature, by insolubility in the second solvent or by chemical activity with the second solvent. The dissolved radioactive material which does not precipitate for any of these reasons is sucked to the inner wall of the tube, with the outer wall staying clean. This flow to the inner wall causes a distribution of the dopant, i.e., originally dissolved radioactive material, which is higher on the inside surface of the tube. When the tube is finally collapsed into a rod this region of high concentration of radioactive materials is entrapped into the total glass system. A high concentration of nuclear waste on the outside of the glass article can be thereby avoided.

Another advantage of the tube configuration is the entrapment of any radioactive gases produced by decomposition of the radioactive materials during the drying step. For example, if ruthenium tetraoxide is produced from the radioactive materials within the pores: it can be aspirated from the center of the tube, out of the drying/collapsing furnace and into another tube of porous glass which is at a lower temperature. The radioactive gases are filtered by the second porous glass tube. The fumes react with the silicate of the glass and precipitate within the pores of the glass. For example, rubidium will be reduced from the tetraoxide to a lower oxidation state and precipitate within the pores. The second tube serves as a micropore filter. Its pores are then collapsed followed by the collapse of the walls of the tube to thereby entrap and immobilize the gaseous radioactive materials in a sealed glass matrix.

As can be seen, the porous glass tubes can be used to absorb radioactive gases from nuclear waste disposal systems which do not utilize porous glass containers. Thus, radioactive fumes from other nuclear waste processing systems can be treated in a porous glass filter. The radioactive fumes may contain particulate radioactive materials and gaseous radioactive materials. Non-radioactive materials, e.g., water, etc. will pass right through the porous glass filters whereas the nuclear waste, for example, ruthenium tetraoxide or cesium would be trapped inside the porous glass filter. When the filters begin to lose efficiency, the filter itself is heated to collapse the pores and the walls of the porous glass filter. Both the particulate radioactive materials which were suspended in the gas and the gaseous radioactive materials are thus entrapped and immobilized in the glass matrix. When using the porous glass container as a filter, it need not be in the test tube configuration. Flat configurations, for example, are equally as good, or even better in some cases, than the test tube configuration.

Another advantage of using a porous glass container (as opposed to a porous glass rod) is that processing time is reduced for a given thickness of porous glass. For example, the time required to fully impregnate a porous glass rod with a 1" radius is the same as that required to fully impregnate a porous glass container whose inner radius is 1" and outer radius is 3". The wall of the glass container is 2" thick but impregnation occurs from both the inside and outside surface, to a depth of 1". In the case of the glass rod, the cross sectional area of the glass is only $\pi$, or about 3.14, square inches. However, for the glass container, the cross sectional area of the porous glass is $8\pi$, or approximately 25.12 square inches or, 8 times greater than that of the rod. Thus, in the same amount of time, a much greater amount of glass can be impregnated. This advantage also comes into play during the drying step, and during decomposition. For comparison purposes, it is assumed that there is zero shrinkage for the porous glass. When the glass container is collapsed, the final diameter of the resulting rod is approximately 2.8". On the other hand, the final diameter of the glass rod which had a 1" radius is approximately 2". Thus, a larger end product containing more radwaste is obtained in the same amount of processing time when the glass container is used.

Particulate Glass Inside Glass Container

A particulate glass which is either a non-porous glass or a porous glass having an interconnected pore structure or mixture of both can be disposed within the glass container. Formation of non-porous particles is well known in the art. Non-porous glass particles of either conventional compositions or modifications thereof can be used. Porous glass particles can be made from glasses having compositions similar to those used to make the porous glass container. For example, a typical borosilicate glass having approximately 7% alkali, for example, sodium oxide or potassium oxide, and having a small amount of alumina is suitable. A content of $B_2O_3$ on the order of thirty to forty weight percent and the remainder being silica is a satisfactory composition for forming the porous glass particles. The porous glass is preferably formed according to the compositions and methods disclosed in U.S. Pat. No. 4,110,096. The glass is melted in a crucible at around 1400° C., stirred, and fined. The crucible can be made of platinum if the process is performed in the laboratory. However, on a commercial or production scale a ceramic crucible can be used.

To make a powdered glass, the molten glass can be poured directly into cold water to crack it and break it into little pieces. Alternatively, the molten glass can be pulled into rods or cast into any desired shape. In the latter situation, the glass is broken in a milling machine. The glass pieces are sieved to provide glass particles of the desired particle size. The sieved glass particles can then be passed through a flame to form them into little spheres. The advantage of making spheres instead of just using the sieved glass particles which have random irregular shapes is that it provides a more uniform and greater density of packing in the glass container. Thus, two kinds of glass particles can be produced. One is just broken and sieved and therefore has elongated grains of random irregular shapes. The other is broken, sieved, and remelted by going through a hot zone and then rapidly cooled to produce glass particles in the shape of tiny spheres. In order to obtain the elongated particles it is preferable to reheat the cast or drawn glass before milling. In this manner, larger pieces of glass, which are easier to handle during milling are obtained.

The particles thus obtained are non-porous and can be used in the embodiment wherein the radioactive material is deposited on non-porous glass particles within the glass container. To make the non-porous glass particles porous, they are reheated at approximately 550° C. for about two hours. They are thus phase-separated and then are leached at approximately 50°–100° C. typically in 3N HCl, or some other mineral acid, such as sulfuric or nitric. Further details on the leaching process are disclosed in the above-mentioned U.S. Pat. No. 4,110,096. The leaching time depends upon the grain size and temperature. Typically about two hours, more or less, are sufficient for the leaching operation. The higher the temperature the faster the leaching occurs. Next, the leaching particles are washed with water. The finished product is a wet, particulate porous glass with pores interconnected throughout each particle which can be used in the process of the present invention. However, by heating the porous glass in excess of 100° C. (typically 150°–100° C.), the water is removed and a dry particulate porous glass is obtained. As the particles dry, they do not stick to each other and it is easy to tell when all water has been removed because a very loose, more flowable, powdery product resembling talcum powder is obtained.

If one uses elongated grains, the packing of the glass container may not be very efficient, typically 60% may be voids and the particles (or grains) may represent only 40% of the interior volume of the glass container. On the other hand, if one uses round spheres they tend to pack better and one can get packing rates of 60% ore more. The ideal for packing of the spheres would be close to a packing rate of 80%. Improvement in packing can be obtained by applying pressure. The more pressure applied to the glass particles, the better the packing that results. Pressure can be applied at lower (cold) temperatures or it can be applied at hot temperatures. Either the hot or cold pressure approach will provide much better packing ratios.

Grain size depends very much on the amount and size of the undissolved particulates in the nuclear waste solution. It is generally preferred to have as large glass particles (grains) as possible, e.g., having diameters of 4 mm or more, because, when the gases from the nitrate or other salt decomposition and from the vaporization of water are coming out, the larger, heavier glass particles will not tend to be blown out of the container. On the other hand, if the amounts of undissolved nuclear waste particles are large, a larger glass area to interreact with and assimilate the undissolved nuclear waste particles is desirable. Under those conditions it is preferable to use glass having a particle size of about 50 microns diameter. They can even be as small as one micron or so by using the fines rather than the sieved fractions. The exact size depends on the exact size of the nuclear waste particles to be encapsulated and empirical methods can be used to good advantage to determine the optimum glass particle size for a given nuclear waste solution. Generally, glass particle sizes ranging from 5 micron to 5 mm, preferably 50 micron to 1 mm, can be used.

The loading of the glass container can be accomplished in any suitable manner desired other than those disclosed hereinabove. For example, the high level (i.e., relatively concentrated) liquid radwaste can be introduced into the glass container, which is closed at one end, is a long tube and is filled with particulate porous glass, through a smaller inner filler tube positioned inside of the glass container. As the high level liquid radwaste is poured through the filler tube into the container, the filler tube is moved vertically so that the level of the liquid radwaste in the glass container rougly corresponds to the level of the lower end of the filler tube and as more liquid is introduced, the filler tube progressively moves upwardly. This has the advantage that whatever solids are suspended or slurried in the nuclear radwaste reach the lower portions of the particulate glass packing in the glass container. These solids are introduced at all vertical levels in the porous particulate glass and there results a relatively uniform vertical distribution of these solids throughout the contained particulate glass packing. The nuclear radwaste is shut off before the filler tube reaches the top so that there is left on top a short section of porous glass packing relatively free of radwaste. This can also be done by shutting off the nuclear radwaste, heating the assembly to drive off the water and then putting clean glass particles on the top.

There are several approaches that can be used in the drying step. First, some glass wool or a porous glass disc or some other kind of porous top can be placed on top of the glass particles to prevent them from moving vertically when gases are driven off from the contained radwaste. Also, an adequate space can be left at the top of the container so that the glass particles can move up as the gases are driven off and then eventually down again after gas flow has stopped. It is also better to dry the container and glass particles by having a relatively small heat zone that is brought downwards from the top to progressively drive off the gases from top to bottom. Otherwise if heat is very deep or applied at the bottom boiling can occur inside the container near the bottom which can cause the glass particles to be blown out at the top. Also, as the vapors rise in the container it is preferable to keep everything above the point at which evaporation is taking place hot enough so that the water will not condense again in the upper regions of the container. Thus, the upper part of the container should be kept above 100° C. (typically 110°–120° C. or 150° C). This procedure can go relatively fast so that by heating from the top, and bringing it down, all the water in the container can be eventually evaporated. Then, when a layer of porous glass particles at the top is dried, it is kept in the temperature range of 100°–150° C. to prevent the escape of other poisonous gases through it. Non-radioactive nitrate decomposition vapors in the container can escape through the dry porous layer while the cesium and the sodium and other radioactive isotopes such as cadmium are caught in this porous sieve. Once the water has been vaporized from the whole column, it can be heated to a temperature of the order of 400° C. fast enough to prevent the distillation of radio-active nitrates. At temperatures of this order, decomposition starts and nitrous oxide fumes are driven off. Again, ruthenium tetraoxide can be a problem for it must be kept from escaping the top of the container by keeping the porous glass particle layer in the top hot enough so that steam will escape but cold enough that $RuO_4$ will stay down in the container while the nitrate decomposition is going on. As long as the nitrate decomposition fumes keep coming off, the material will be under high oxidizing conditions and there is not much chance that ruthenium will be reduced to lower, less volatile, oxidation states.

Once the decomposition of the nitrates is complete, a vacuum can be applied to the interior of the container while maintaining the elevated temperature, thus reducing the vapor pressure of oxygen low enough so that ruthenium tetraoxide spontaneously decomposes to lower oxidation states which have a high temperature characterization or a very low vapor pressure, thereby permenantly trapping the ruthenium in the glass. The vacuum should be applied before the porous glass actually starts to close its pores under heat because under such conditions one can also reduce the amount of dissolved gases in the final product. In effect, by reducing the amount of gases inside of each glass pore, the amount of soluble gases in the glass is lowered. Thereafter, the temperature is raised and whenever there is a pressure jump vacuum is applied until the pressure comes down again quietly. Around 1300° C., the exact temperature depends on furnace configuration, container bore size, the type of particulate glass, etc., the tube collapses. If the walls of the container are thin, they will collapse to a flat or elliptical cross section forming more of a ribbon than a rod. If the walls are thick, a rod-like cross section is emphasized. Another way of favoring the rod-like cross section is to pull on the container while heating so that it stretches while it collapses. For convenience in packing the finished glass articles, it may be easier to pack a rod-like cross section for storage. If there is a major heat transfer problem, however, it may be more convenient to work with flat ribbon-like cross sections in order to alleviate such heat transfer problems. By using a narrow heat zone and moving it up from the bottom, a region near the top is reached where there are no glass particles left and the glass container collapses on itself to provide further improved sealing of the nuclear waste.

If the degasing is performed properly, there will be only a very minute amount of bubbles and there results a finished product which has an envelope of low temperature expansion coefficient, radiation free glass enclosing a high temperature expansion coefficient glass. This provides compression on the outer glass layers and tension on the inner core of glass. If the inside glass is relatively free of bubbles, it will support the tension and make the final article a strong prestressed material having a modulus of rupture considerably in excess of annealed glass. The advantages of keeping the finished product monolithic are the following: (1) the outer surface area of monolithic glass is much smaller than if it is discontinuous and, since the amount of leaching is proportionate to the surface area, the risk of leaching is reduced considerably, (2) in the case where there is no nuclear waste in the outer layers of the container, there is no nuclear waste available to be leached in the initial period of leaching conditions until, if ever, the leaching is able to continue through the thickness of the rad-waste-free outer layers of the collapsed container. This can be designed to be a long period compared to the short half-life of the radioactive isotopes encapsulated inside the container thus encapsulating them for the life of their radioactivity and no radioactivity is exposed to the biosphere. Furthermore, the processing of nuclear waste according to this invention has the advantages that it utilizes no furnace electrode which can be corroded by the molten glass, no fumes of radioactive elements are expelled, and in general a very clean operation is possible. In the event that a glass container breaks, the glass can be disposed of by comminuting it into particles or by remelting it and processing it into particles as explained above and disposing said particles into another glass container. Thus, no new waste is produced requiring a separate disposal system.

A monolithic (not particulate) porous glass rod or similar preform containing a radwaste solution tends to break when heated because internal pressures build up because of the boiling away of internal water. If violent enough the internal pressures can become great enough to cause the glass preform to break. Also, after the bulk of the liquid has been removed, as the preform dehydrates, it shrinks and, if the dehydration has been uneven, unequal stresses are developed when one side has shrunk more than the other which can cause the preform to break. Furthermore, at the slightly higher temperatures used to decompose the salts, such as nitrates, gases, e.g., nitrous oxides are given off. Again, too fast an evolution of such gases can break the preform.

In addition, if the material is deposited unevenly in the monolithic porous glass rod or similar preform the dopant increases the thermal expansion coefficient of the silica component of the glass preform and, upon collapsing of the pores by heating, the uneven expansion coefficient can lead to breakage. The dopant distribution profile in the monolithic glass preform has to be very well controlled in order to avoid breakage. These problems are greatly reduced or eliminated when using porous glass particles in a glass container. The individual particles are so small that the stresses built up in them during heating are not great enough to break them and if a few do break it causes little or no problem and the heating can be accomplished much faster. Also, the cross sectional dopant distribution profile in the final product can be important. In the case of a non-porous glass container the outer layers of the final product will have the initial thermal expansion coefficient of the container which can be made with a lower thermal expansion coefficient than the glass particles inside. Thus, the final product, in this case, exhibits compression at the surface which makes it stronger.

Moreover, the use of a glass container containing porous and/or non-porous glass particles has the further advantage of providing distribution of the deposited radioactive solids throughout the interior of the tube rather than just on the interior surface walls of the container in the case of a glass container in which no glass packing is used or on the exterior surface of a porous glass rod when that is used. Also, when a glass particle-filled, non-porous glass container is employed, the resulting clad is free of radioactivity thus providing essentially no radiation contamination risk to the environment.

In the processing of glass containers pursuant to this invention, the only way that gases can escape from the container is through the open end. A convenient way to control these gases is to insert a layer of porous glass in the open end of the container. It will act as a molecular sieve and because of its very large initial surface area, e.g., hundreds of square meters per gram, the gases attempting to pass out of the container are trapped by it. By controlling the temperature of the porous glass layer, the passage of water, non-radioactive nitrate decomposition products, and other non-radioactive fumes that it is desirable to get rid off, can be permitted while at the same time trapping in the container the ruthenium, cesium, cadmium, and other radioactive materials. The differences in temperature along the container can be used to advantage in driving off the non-radioactive volatiles while preventing escape of radioactive materials.

It is also advantageous to be able to collapse the container into a rod of smaller dimensions or into a tape having one small dimension, i.e., its thickness, and a larger width. The smaller dimension facilitates more uniform heat removal, i.e., it reduces the temperature gradients in the resulting glass and avoids or considerably reduces cracking.

Non-Porous Glass Packing

The glass container can be packed with non-porous glass particles in addition to or in place of the above-mentioned porous glass particles. The non-porous glass particles can be made from any suitable glass forming composition using the operational procedures described hereinabove relative to the porous glass particles except, of course, the phase-separating and acid-leaching steps are not necessary in the case of non-porous glass. Non-porous glass particles thus can be in the form of spheres, elongated grains or any other suitable shapes and function in the glass container in essentially the same way as the porous glass particles except that there are no pores into which dissolved radioactive materials permeate. Therefore, the radioactive materials, both dissolved and undissolved, are deposited on the peripheral or outer surfaces of the particles and in the subsequent heating step the oxide forms of the radioactive material react with the molten non-porous glass particles and become an integral part of the final glass product while other forms are entrapped deep within the final glass product. In many cases, it is preferred to use a moving heat zone with a differential pressure produced by evacuating the interior of the container or by applying greater pressure externally as by mechanical means or by gaseous means.

It can also be advantageous in using a moving heating zone to progressively collapse the container from the bottom up. If the container is very long it may not be able to support its weight if supported only at its upper regions and can be supported also at the bottom so that it will not elongate during collapsing. On the other hand if it is desired to stretch the tube so that it will collapse into a rod rather than a flat slab, a small pulling force (in addition to gravity) can be applied from the bottom of the container and will produce a rod-shaped object.

In order to prevent cracking of the glass container enclosing glass packing, the glass container must have a lower thermal expansion coefficient than the resulting enclosed glass which is obtained when the glass container and contents containing the deposited radioactive materials are heated to sinter the glass packing thereby providing an enclosed glass doped with radioactive materials. Silicate glasses with or without small amounts of boron (e.g. Vycor) have low thermal expansion coefficients and, as alkali metal content is increased, the expansion coefficient materially increases. It is preferred that the container not collapse prematurely, even when the inside is under vacuum and the outside is under atmospheric pressure at temperatures at which the enclosed glass packing begins to melt so that it remains a container which will contain the enclosed glass until it is advantageous to collapse the container. In that respect, it is preferred to use a container having a higher glass transition temperature (silicate glass and Vycor are advantageous). When the particles of the glass packing are heated, they will degas as solid objects below the glass transition temperature or even just above the glass transition, as long as the glass is not so hot that the particles coalesce with each other. At a slightly higher temperature, the glass particles melt into each other, i.e., they coalesce, and become a unitary glass body which, if done properly, is bubble-free. If the container collapses at a temperature which is slightly higher than the $T_G$ of the interior molten glass (including deposited solids), a bubble-free final glass product containing the nuclear waste results. However, if the container is not collapsed until a much higher temperature is reached, there is the risk that the solubility of gases, such as oxygen in the interior molten glass will decrease to a point where the content of the gas, e.g., oxygen, exceeds in solubility in the molten glass because it is under the vacuum used to collapse the container. When the gas (oxygen) content exceeds its solubility at the temperature and reduced pressure of the interior molten glass before the container collapses, bubbles and foam can form in the interior molten glass. Once the tube collapses, the interior is no longer subject to vacuum but at that time is subject of the external pressure; thus, solubility of the gases in the interior molten glass increases and the danger of bubble or foam formation is relieved. Prevention of bubble or foam formation requires fairly accurate selections of the container glass transition temperature and the interior glass transition temperature of the interior glass composition including the deposited radioactive solids. Again, if the interior glass composition is too soft for Vycor or a fused silica glass container, the collapsing temperature of the container can be lowered by using a container glass such as Pyrex. Of course, the manufacture of compositions having any desired glass transition temperature is well within the skill of the art and any means available can be used to provide glass compositions having suitable $T_G$'s for the container and the interior glass packing. The container glass composition should be higher melting than the interior glass composition including deposited radioactive solids; i.e., it should have a higher transition temperature and should be able to collapse only after the interior glass composition has sintered. The presence of interior bubbles is not intolerable in many cases; however, if the absence or reduction of bubbles or foam is desired the $T_G$'s of the glass compositions used should be selected as explained above.

When using high silica (>90 mole % $SiO_2$) low alkali (<0.5 mole % $Na_2O$) porous glass as a packing: (a) Pyrex tubes collapse at too low temperature to permit sintering of the packing; and (b) Vycor tubes have the following disadvantages:

(i) The thermal expansion coefficient is so low that it can only be matched by the core glass when the loading is very low (e.g. less than 5 weight % for the UK composition, see Example 25).

(ii) Because of the high collapsing temperature (about 1300°-1400° C.) it may cause volatilization of Cs and other nuclear wastes.

While Pyrex and Vycor nuclear waste containers are suitable for many of the applications as shown in the examples, other compositions have preferred properties. The preferred container is produced by: (a) producing a porous glass container, such as a tube, as described in U.S. Pat. No. 4,110,096 at column 10, line 50 to column 16, line 36, and (b) doping said porous glass container with at least one dopant selected from the group consisting of cesium, rubidium, strontium, and copper. The doping could be accomplished by either of two methods:

(1) The preform is immersed in a solution containing the dopant ions at a pH between 9 to 13.5, preferably between 10 and 13, for a time which depends on the wall thickness and the desired concentration of dopants. Typically, the immersion time is between 1 hour and 7 days. The pH of the solution is preferably adjusted with $NH_4OH$. For maximum speed of ion exchange, the solution is saturated with the desired dopant ions. Usually the dopants are introduced into the solution as nitrate compounds. However, chlorides and carbonates can be used.

(2) The porous preform is immersed in a solution of dopant or a dopant compound. After the dopant concentration is uniform throughout the preform, the dopant is precipitated by dropping the temperature. The preform is immersed in a solution free of dopant. The dopant is allowed to partially dissolve and diffuse out of the matrix. Only the dopant precipitated near the outer surface is removed in this step. Further details of molecular stuffing are described in U.S. Pat. No. 4,110,096.

In both methods, the doped porous preform is then dried and heated to the collapsing temperature of the pores. The drying should not substantially change the dopant distribution in accordance with the teachings in U.S. Pat. No. 4,110,096. Upon collapse of the pores, the container changes in appearance from opalescent to clear without a substantial change in shape other than the shrinking of its linear dimensions by about 20%. In addition, the dopant is used in an amount so as to result in a dopant concentration range of from 0.5 to 6 mole % based upon the total oxide content of the shrunken glass product. The porous glass preform usually has 4 mole % $B_2O_3$, but may have up to 8 mole % Boron or other silica components. Thus, the shrunken container will have more than 86 mole % silica. However, more than about 90 mole % silica is preferred because the silica increases the chemical durability of the glass.

Of the above two methods for introducing the dopant into the porous glass, method 1 is preferred. The dopant concentration is very uniform throughout the cross-section of a preform doped according to method 1. This high uniformity permits further preparing of the container by conventional glass blowing techniques. In Example 27, for example, the glass tube produced by method 1 (the ion exchange method) is heated and one end is closed without breakage.

Since the preferred nuclear waste container should have both lower viscosity (lower collapsing temperature) and higher expansion coefficient than a 98% $SiO_2$ glass, the addition of alkali dopants seems appropriate. We have discovered that at concentrations higher than 85 mole % $SiO_2$ and lower than about 5 mole % alkali, the chemical durability of Cs or Rb glasses is far superior than that of the Na or K glasses of comparable composition. At room temperature, for 2 mole % alkali dopant, sodium glass is 1000 times less durable than cesium glass, and for cesium and rubidium at 100° C., rubidium is 10 times better than cesium glass. The chemical durability for the cesium and rubidium glasses were measured by a leaching rate measurement in water of pH roughly 5.6 and 20° C. The leaching rates were found to be below $10^{-9}$ gms of silica per square cm of exposed surface of the sample per day after 20 days soaking time. This is an excellent chemical durability. However, while high chemical durability is obtained with a rubidium dopant, a cesium dopant is preferred because of the much lower cost of cesium. Divalent elements that can be advantageously incorporated together with Cs and/or Rb are Sr and Cu.

In choosing the dopant and the concentration, one must not only consider the chemical durability but also the matching of thermal expansion coefficient and container collapse temperature to the sintering temperature of the nuclear waste powder. One ordinarily skilled in the art can obtain such a matching by independently adjusting the following variables: composition of nuclear waste, loading of nuclear waste in core material, dopant compositions and concentrations of dopant in container. However, some of the product may still crack, permiting the core to be exposed to the outside. Because of the large surface area of the core glass which is still covered by container glass (cladding) there is still a very major reduction in leaching rates of nuclear waste material into water due to the presence of said cracked cladding. Thus, we still consider this to be sealed.

The present invention, which includes porous cation exchange particles in a glass container, can be employed to remove dissolved and undissolved radioactive solids from highly dilute solutions of same. For example, solutions containing as little as 1 ppt (part per trillion based on weight, i.e., 1 wt. part per $10^{12}$ wt. parts solution of radioactive cations can be purified. Dilute solutions having less than 0.01 microcurie radioactivity per ml as well as more concentrated solutions, e.g., those having 1 curie or more radioactivity per ml and those solutions between 0.01 microcurie and 1 curie radioactivity per ml, are efficiently treated by this invention.

In a typical nuclear reactor there are several sources of radwaste as described hereinabove that must be safely contained. These include highly dilute liquid waste streams which can contain dispersed radioactive solids as well as dissolved radioactive solids, e.g., cations; concentrated liquid wastes which can contain radioactive cations, radioactive anions and radioactive solids (such wastes are the result of the boiling down of primary coolant containing boric acid initially used in the coolant as a chemical shim and the boiling down of used regeneration solutions from the regular ion exchange beds customarily used); and/or radioactive gases such as radioactive krypton and/or radioactive iodine. Therefore, our invention includes a total radwaste disposal system wherein particulate porous glass or silica gel as disclosed in the above-mentioned concurrently filed application having silicon-bonded alkali metal oxy, Group Ib metal oxy, and/or ammonium oxy groups is packed into a cation exchange column which preferably is a fusible glass column. The glass or silica gel particles can be held in the column by means of a porous closure such as glass wool or a porous disc in its lower end and, if desired, in its upper end also. In addition, the porous and/or non-porous glass particles can be mixed with the ion exchange glass or silica gel particles in the column to provide additional external surface on which dispersed, unsettled solids can settle out. It is preferred that the porous glass or silica gel be finely divided and sieved to a suitable size to maximize the rate of flow of the radwaste stream through and between the particles of the porous glass or silica gel and to also minimize the ion exchange time. First, the dilute radwaste stream is passed through the column and the radioactive cations in solution are cation exchanged with the alkali metal, Group Ib metal and/or ammonium cations in the porous glass or sillica gel to chemically bond the radioactive cations to the glass or silica gel. If the dilute radwaste stream is to be reused as the primary coolant, it is conventional to add lithium ions as a corrosion inhibitor. Therefore, it can be advantageous to utilize a porous glass or silica gel having silicon-bonded lithium oxy groups so that lithium ions (which do not become radioactive as do sodium ions) are released to the coolant stream as radioactive cations are removed from it. Additionally, dispersed, undissolved radioactive solids in the dilute radwaste stream can be mechanically filtered on the porous glass or silica gel particles in the column as the stream percolates through and between the particles. In order to maintain the ratios of solids in the radwaste stream to the porous glass or silica gel small enough to maintain the filtering action as the solids accumulate on the porous glass or silica gel particles, fresh porous glass or silica gel particles can be added to the column.

After the column has been exhausted of its ion exchange capacity by the dilute liquid radwaste stream, it can be dried and the concentrated liquid radwaste (containing concentrated boric acid, for example, at a temperature 100° C.) can be added to the column. Thus, the pores of the porous glass or silica gel can be stuffed with the radioactive solids, cations and anions contained by the concentrated radwaste. Excess boric acid then can be washed from between the particles of the porous glass or silica gel using cold water (less than 30° C.) and the particles can be dried to deposit the radioactive solids, cations and anions within the pores of the porous glass or silica gel using techniques taught in U.S. Pat. No. 4,110,096. Thereafter, the column can be first evacuated to remove decomposition gases. Then the radioactive gases can be introduced into the glass column, and the column can be heated to collapse the pores of the porous glass or silica gel and to collapse the glass column thereby immobilizing and containing the exchanged radioactive cations, the radioactive solids on the exterior of the porous glass or silica gel particles, the radioactive solids, anions and/or cations deposited in the pores of the porous glass or silica gel and the radioactive gas contained by the gas column. Suitable pressure differentials can be used to facilitate the collapsing of the glass column. Heating can be continued to cause the porous glass or silica gel particles to stick to each other to further trap interstitial radioactive solids between the particles. Upon cooling there results a highly durable solid which effectively contains the radioactive waste introduced into the glass column.

Because some of the nuclear reactor streams may be basic, some elements in the radwaste appear as anions, e.g., chronium, molybdenum, praseodymium and cerium anions, which, of course, have to be immobilized also. One way to accomplish this is to pass the basic radwaste stream through a customary anion exchange resin column. The column is regenerated with non-radioactive base, e.g., ammonium hydroxide. The effluent from said regeneration contains a higher concentration of radioactive (pernicious) elements and is boiled down in a boiler to provide a reduced volume of basic radwaste. When the concentrated basic radwaste in the bottom of the boiler is acidified under reducing conditions, some of the anions, e.g., Cr, Mo, Ce and Pr become cations which can be ion-exchanged with and removed by the above-mentioned porous glass columns. The boiler bottoms are defined as the concentrated solution or raffinate which remains after boiling down the solution and it may contain solids. It can be molecularly stuffed into the porous glass to become a highly durable solid waste product.

There are many other industrial wastes which have to be eliminated from waste streams which, although not radioactive, are very poisonous to humans. For example, it has been well publicized that water bodies have been contaminated in the past with mercury, cadmium, thallium, lead, other heavy metals insecticides, and organic poisons. Often the concentration of such toxic substances in the waste streams is very low, thus presenting the problem of treating large volumes of water containing small amounts of toxic substances. Nevertheless, overall, large quantities of such contaminants do enter the ecosphere. The present invention can be used to purify such waste streams.

This invention can be employed for concentrating and immobilizing radioactive cations in glass for extremely long time storage. For example, the sintered, silicate glass loaded with radioactive solids can be appropriately packaged in containers and buried beneath the earth'surface or at sea. Alternatively, the radioactivity of the sintered glass product containing the radioactive solids can be utilized in suitable devices or instruments for a variety of purposes, such as, destroying microorganisms, e.g., in the preservation of food, or in sterilizing sewage sludge or for any other purpose where radioactivity can be employed constructively.

A typical range of radioactive solids content of the glass products of this invention resulting from the treatment of low level waste is about 1 ppb to 20,000 ppm, preferably about 10 ppb to about 1000 ppm of the glass product. A typical range of radioactive solids content of glass products of this invention resulting from the treatment of high level radwaste is about 2 wt. % to about 30 wt. % or more. Glass products of this invention which are to be used as radioactive sources can have solids contents falling in the above-mentioned ranges.

In general, the glass articles of this invention comprise a first non-porous glass portion and a second non-porous glass portion surrounding the first portion. The first portion contains radioactive materials entrapped and immobilized therein and the second portion contains further radioactive materials entrapped and immobilized therein. The radioactive materials in one of said portions is derived from radioactive materials which were soluble in a nuclear waste (radwaste) solution and the radioactive materials in the other portion is derived from radioactive materials which were insoluble in said nuclear waste solution. For example, the radioactive materials in the first portion are derived from materials which were insoluble in the radwaste.

As another example, the radioactive material in the first portion is derived from the radioactive materials which were soluble in the radwaste.

Furthermore, the glass articles of this invention can include a third non-porous glass portion which surrounds the second portion, and the third portion is free of radioactive materials. The radioactive materials in the novel glass articles are described above. Also, the insoluble radioactive materials can be metallic precipitates of the platinum metal family. The glass article can be rod-shaped, tape-shaped or any desired shape.

The following examples are presented. Unless otherwise specified all solutions are aqueous solutions. The "aqueous ammonium hydroxide" or "$NH_4OH$" used in the Examples contained about 28% $NH_3$, ppm means parts per million parts of solution, ppb means parts per billion parts of solution, ppt means parts per trillion parts of solution, all parts and percentages are on a weight basis and all temperatures are given in degrees Centigrade. For reasons of safety all simulated radwaste solutions used in the Examples were actually non-radioactive; however, radioactive solutions of the same kind can be substituted and concentrated and encapsulated in accordance with the following Examples.

EXAMPLE 1

Preparation of Glass Particles and Tubes

A. A molten glass was formed in a platinum crucible at 1400° C. from sand, boric acid, sodium carbonate and potassium carbonate, the glass having a nominal composition of 3.5 mole percent $Na_2O$, 3.5 mole percent $K_2O$, 33 mole percent $B_2O_3$ and 60 mole percent $SiO_2$. The molten glass was vertically updrawn and solidified into rods having a diameter of about 0.8 cm and a length of about 100 cm which were then crushed in a stainless steel cylinder with a stainless steel rod. The resulting powder was sieved and the fraction between 32 and 150 mesh screens was selected for use in certain of the following Examples.

B. Tubes were formed by pulling the above-described molten glass and applying a small internal pressure. Tubes that were sealed at one end were formed by turning off the internal pressure during the drawing operation. Tubes open at both ends were formed by maintaining the internal pressure through the drawing and cut-off operation. The tubes were formed with an outside diameter of about 1 cm and a wall thickness of about 0.15 cm and were cut to about 5 cm long.

EXAMPLE 2

Preparation of Porous Glass Tubes

A base glass tube having one sealed end and one open end was prepared as described in Example 1B. The tube was then heat-treated at 550° C. for 110 minutes in an electric furnace to induce suitable phase separation. The tube after heat-treatment was annealed by cooling slowly down to room temperature, and was leached to form a porous tube by soaking it in a 3N HCl solution saturated with $NH_4Cl$ at 95° C. for two days. The porous tube was then soaked in hot water for one day to wash out residue from the leaching operation and was then kept in a dessicator until the pores were dry of the washing water. The resulting porous glass tube had a nominal composition of 95 mole percent $SiO_2$, 5 mole percent $B_2O_3$ having interconnected pores, and an internal surface of about 100 $m^2/g$. The surface of the resulting porous glass tube was saturated with $\equiv SiOH$ groups.

EXAMPLE 3

Preparation of Porous Glass Powder

Glass rods were prepared as described in Example 1A. Before crushing the glass rods, they were heat-treated at 550° C. for 110 minutes and then crushed to form glass powder. Next the glass powder was sieved and the fraction passing through a 32 mesh screen but not through a 150 mesh screen was leached in a 3N HCl siolution at about 95° C. for about six hours. The glass powder was washed with deionized water for about 24 hours at about 25° C. The resulting porous glass powder had a nominal composition of 95 mole percent $SiO_2$; 5 mole percent $B_2O_3$, had interconnected pores, and had an internal surface of about 100 $m^2/g$. The resulting glass surface was saturated with SiOH groups. The porous glass powder was dried in a beaker on a hot plate at about 150° C.

EXAMPLE 4

Use of a Porous Glass Tube to Concentrate and Encapsulate

A dry porous tube having one open end and one closed end, prepared as described in Example 2, was impregnated with a solution containing dissolved $CsNO_3$ and $Al_2O_3$ particles simulating a nuclear waste fluid. The $CsNO_3$ solution contained 67 g of $CsNO_3$ (which could be radioactive) dissolved in 23 ml water at 100° C. and 10 g of $Al_2O_3$ representing suspended solids (which could be contaminated with radioactive isotopes). The interior of the tube was filled with the dopant solution, and the solution was allowed to penetrate into the pores. Some of the solution in the tube was allowed to pass through the tube walls to the outside of the tube and was collected for use in other tubes. This was continued until the interior of the tube was essentially empty of the solution. The $Al_2O_3$ solids suspended in the solution, however, being much larger than the pore size of the tube walls were retained in the interior of the tube. Also, the solution containing the dissolved $CsNO_3$ filled the pores of the glass tube walls. The resulting laden porous tube was then inserted in methanol at 0° C. to cause the dissolved $CsNO_3$ in the solution in the pores to precipitate in the pores. The inner and outer surfaces of the laden tube were soaked in clean methanol at 0° C. for 24 hours, while changing the methanol often, resulting in thin layers on both the outside and inside surfaces of the tube in which the concentration of the precipitated $CsNO_3$ was lower than the concentrations of precipitated $CsNO_3$ deeper in the glass. (That is the inner and outer surface layers or regions contained approximately one fifteenth of the $CsNO_3$ concentration of regions located deeper in the tube wall.)

The porous tube was then removed from the 0° C. methanol bath and placed into a larger diameter (3.5 cm), substantially non-porous, fused silica glass tube having an open end and was dried under vacuum at 0° C. for 24 hours. The fused silica glass tube containing the laden porous tube was then allowed to warm under vacuum to room temperature and was put into a furnace where it was slowly heated at 15° C./hr up to 625° C. This heating period allowed the pores of the glass to dry further. The laden porous tube inside the non-porous tube was held at 625° C. for 16 hours to ensure that all the $CsNO_3$ was decomposed and the resulting nitrogen oxides were expelled leaving $Cs_2O$. It was then heated to 875° C. still under vacuum in order to fuse the pores and sinter the glass structure of the porous glass tube thus converting it into a substantially non-porous glass tube with the cesium ($Cs_2O$) trapped as a part of the glass structure. The solid ($Al_2O_3$) remained deposited on the tube interior. The tube is placed horizontally on a graphite block in a ceramic tube furnace with another graphite block resting on top of it. It is heated to about 1350° C. and the tube sags under the weight of the upper graphite block causing the interior surfaces of the tube to fuse and seal together, thus immobilizing and encapsulating both the $Cs_2O$ from originally dissolved $CsNO_3$ and the originally dispersed $Al_2O_3$ solids.

EXAMPLE 5

Use of Porous Powder in Non-Porous Tube to Encapsulate

A non-radioactive aqueous solution simulating a radwaste stream projected for an existing spent nuclear fuel reprocessing plant and containing 3.06 g $Fe(NO_3)_3.9H_2O$, 1.68 g $Ce(NO_3)_3.6H_2O$, 0.78 g $La(NO_3)_3.6H_2O$, 0.78 g $CsNO_3$, 3.88 g $Nd(NO_3)_3.5H_2O$, 0.52 g $Ba(NO_3)_2$, 2.72 g $Zr(NO_3)_4$, 0.42 g $Sr(NO_3)_2$, 0.34 g $Y(NO_3)_3.5H_2O$ and 5 ml water, with all elements in solution except $Zr(NO_3)_4$ which was present as a precipitate, was poured into a 50 ml beaker which contained 5 g of porous glass powder made as described in Example 3. The excess solution was decanted and the beaker was heated to 200° C. on a hot plate to dry the glass powder and deposit the dissolved nitrates in the pores of the glass powder and the undissolved $Zr(NO_3)_4$ on the outer surfaces of the glass powder. The laden glass powder was then placed in a Vycor tube (Corning 743170-4381) having a nominal composition of 96% $SiO_2$ and 4% $B_2O_3$, an inside diameter of 7 mm, an outside diameter of 9 mm and a length of 50 cm. The tube was sealed at one end and was connected to a vacuum pump. The tube containing the laden porous glass powder was then inserted into a furnace at room temperature under vacuum and heated at 15° C./hr up to 600° C. to evaporate any remaining water or other volatiles and to decompose the nitrates present into the corresponding metal oxide and nitrogen oxides and to expel the nitrogen oxides. After holding at 600° C. for 24 hours., the tube was transferred to a second furnace capable of providing higher temperatures. Upon transferring from one furnace to the other, the temperature dropped to 530° C.

The temperature in the second furnace was increased gradually from 530° C. to 1340° C. over a period of three hours and 25 minutes. The tube was removed and was found to have collapsed above the level of the glass powder which had been impermeated with the simulated nuclear waste solution. This occurred because the furnace had a relatively large temperature gradient across it, and the tube had been inserted too far. Nevertheless, the final product was a partially collapsed tube completely sealing within it the glass powder with no cracks present in the tube. The uncollapsed lower portions of the tube contained the impermeated glass some of which was a loose powder, some of which had melted into chunks and some of which had melted and stuck to the interior walls of the tube. There were no breaks in the tube walls and no stress of the tube walls was observed under crossed polaroids. The resulting product effectively encapsulated the metal oxides resulting from the metal nitrates in the initial simulated nuclear waste stream and isolated them from the environment.

EXAMPLE 6

Use of a Porous Glass Powder In a Non-Porous Glass Tube to Encapsulate

Porous glass powder prepared in the manner described in Example 3 was poured into a 100 ml beaker and soaked at room temperature for 17 hours in a basic solution of 12 ml $NH_4OH$ and 14 gr $NaNO_3$ in 38 ml of water. Ion exchange took place as described in the above-mentioned concurrently filed application to form silicon-bonded sodium oxy groups on the outer surfaces of the glass powder particles and in the pores of the glass powder. The solution was then poured off and the porous glass powder was rinsed to a neutral pH. A simulated radwaste solution containing 12 grs $Cu(NO_3)_2$ and 12 grs $CsNO_3$ in 73 ml of water was poured into the beaker to cover the glass powder and the latter was allowed to soak for 16 hours. The solution was then removed leaving behind Cs and Cu ions bonded to the glass through silicon-bonded oxy linkages. The laden powder was rinsed in water and dried on a hot plate at about 200° C. for one hour. It was then poured into a Vycor tube of the kind described in Example 5. The tube and contents were evacuated in vacuum and further dried in a furnace at room temperature and then heated to 450° C. overnight in an electric furnace. It was then heated according to the schedule given in Table 1 below:

TABLE 1

| Time (Hour:Minute) | Temperature, °C. | Pressure, m Torrs |
|---|---|---|
| 9:12 | 450 | 4 |
| 9:25 | 680 | — |
| 9:42 | 1230 | 4 |
| 9:50 | 1350 | 4 |

Between 9:25 and 9:42, the porous glass beads sintered and became non-porous trapping both Cu and Cs ions within the resulting glass structure. The glass tube was further heated while a mechanical vacuum pump was holding the pressure to 4 m torrs and at about 1350° C. the tube collapsed. The tube was withdrawn from the furnace, and cooled. After sufficient time, both the outside Vycor glass and the inside sintered glass powder cooled below their respective glass transition temperatures and stress built up between both glasses. On further cooling the Vycor cracked. In order to prevent cracking, the original outside glass tube should have a higher thermal expansion coefficient to match or approximate the coefficient of the interior mass of sintered glass powder and Cu and Cs ions in it. Nevertheless, the tube did perform the important function of containing the potentially radioactive vapors, e.g., $CsNO_3$, Cu, $CuNO_3$ vapors, during processing. These vapors condensed on the interior upper surfaces of the tube and thus were prevented from entering the environment.

EXAMPLE 7

Use of Cation Exchange Porous Glass Powder to Concentrate Dilute Radwaste and Encapsulate Radioactive Materials Removed Therefrom When handling low level nuclear waste, the concentration of the dissolved and undissolved radioactive materials in the solution can be very low. Additives to prevent corrosion, often make such waste streams basic. A simulation of such a stream was performed by adding 0.011 g $CsNO_3$, 0.018 g $Cu(NO_3)_2$, 12.5 ml aqueous $NH_4OH$ solution (28% $NH_3$) to water to form 50 ml of solution. The porous glass powder prepared as described in Example 3 was added to the above solution and stirred for three hours. The cation exchange porous glass powder became pale blue due to the exchange of protons (of the hydroxyl groups on the internal and external surfaces of the porous glass powder) by copper cations which then became bonded to silicon through oxy linkages. The solution was removed from the glass powder which was then rinsed in water and dried on a hot plate at about 200° C. for one hour. The powder was poured into a Vycor tube of the kind described in Example 5 and the tube and contents were evacuated under vacuum and gradually heated in a furnace from room temperature (about 20° C.) to about 1350° C. over a period of about three hours and 5 minutes.

During heating the pores of the glass powder collapsed and the powder sintered into an integral mass trapping the Cs and Cu ions within it. During the last stages of heating the tube collapsed. Because the amount of simulated nuclear waste (Cs and Cu) encapsulated in the porous glass powder was small, the viscoelastic properties of the tube and the sintered glass powder matched each other more closely than in Example 6, and the final glass capsule did not crack. It remains monolithic and provided a continuous cladding around the mass of sintered glass powder containing the simulated radioactive Cs and Cu.

EXAMPLE 8

Encapsulation of Calcined Nuclear Waste in a Vycor Tube for Burial

About 1.5 ml of a non-radioactive aqueous solution simulating a radwaste stream projected for a spent nuclear fuel reprocessing plant and as described in Example 5 were placed in a 50 cm long Vycor tube which also is described in Example 5. The solution included dissolved nitrates as well as precipitated $Zr(NO_3)_4$ as described in Example 5. No glass powder was added. The tube was connected to a vacuum pump by a rubber hose. In order not to have excessive bubbling, the tube was placed in an ice bath at 0° C. and pumped overnight to dry its contents. The next day the temperature of the tube was 28° C. and the interior pressure was 20 m Torrs. The tube was transferred to a furnace where it was heated under vacuum according to the heating schedule given in Table 2 below.

TABLE 2

| Time (Hours:Minute) | Temperature, °C. | Pressure, m Torr |
|---|---|---|
| 12:45 | 70 | 137 |
| 13:40 | 80 | 40 |
| 13:50 | 130 | 140 |
| 14:05 | 155 | 50 |
| 14:25 | 190 | 79 |
| 14:50 | 190 | 25 |

TABLE 2-continued

| Time (Hours:Minute) | Temperature, °C. | Pressure, m Torr |
|---|---|---|
| 15:15 | 290 | 50 |
| 15:30 | 340 | 80 |
| 15:40 | 350 | 55 |
| 16:05 | 450 | 34 |
| 17:05 | 600 | 16 |
| 18:10 | 850 | 16 |
| 20:00 | 1340 | 14 |

At 20:00, after seven hours and 15 minutes of heating, the tube which had collapsed during heating, was removed from the furnace. From the data in the above Table, it can be seen that pressure maxima occurred at 12:45, 13:50 and 14:25. This appears to have been due to the evaporation of water still in the tube when it was placed in the furnace and appears to have occurred each time when the temperature was significantly raised. If the temperature is held constant as at 13:40, 14:05 and 14:50, the pressure is reduced as the water vapor is taken off by the vacuum. Another maximum occurs around 15:30 at about 300°–400° C. which is apparently due to the decomposition of nitrates to form nitrogen oxides.

The final product was a collapsed and sealed Vycor tube with calcined simulated nuclear waste (i.e., the oxides Fe, Ce, Ha, Cs, Nd, Ba, Zr, Sr and Y) encapsulated inside the collapsed and sealed tube. The surface of the collapsed and sealed tube showed no cracks. When the tube was examined under polarized light it was found to be free of stress. The resulting product was suitable for burial in the ground or sea and can be packaged with other like products in larger containers for such purposes.

EXAMPLE 9

Use of Non-Porous Glass Powder in a Non-Porous Glass Tube For Encapsulating Nuclear Waste For Burial Pyrex glass (Corning 234030-510) having a nominal composition of 81% $SiO_2$, 2%, $Al_2O_3$, 13%, $B_2O_3$ and 4% $Na_2O$ (given in wt. %'s) was crushed in a stainless steel cylinder using a stainless steel rod. The crushed glass was sieved and the fraction which passed through 60 mesh and was caught on 150 mesh was selected for use. 9.5 Gms of the selected fraction of Pyrex powder was mixed with 0.5 gm of porous glass powder impregnated with simulated nuclear waste stream and dried as described in Example 5. The mixed powder was further dried in a beaker on a hot plate at 110° C. for about two hours. Part of this mixed powder was then placed in a 50 cm long Pyrex tube having the nominal composition given above, a 9 mm O.D. and a 7 mm I.D., so that it formed a column 10 cm high. Also, a piece of platinum wire, 1 cm long and 1.5 mm in diameter was added to the powder in the tube. The open end of the tube was attached to a vacuum pump and placed in a furnace where it was gradually heated from about 25° C. to about 830° C. in about four hours and 35 minutes. The finished product developed some cracks after it was pulled out of the furnace. The cracks appeared to be internal and did not extend to the outside surface of the collapsed Pyrex tube. The resulting product effectively encapsulated the glass powder containing simulated radioactive waste materials and platinum which represented the platinum group metals such as Pd, Ru and Rh that are commonly dispersed solids in nuclear waste streams. The cracking can be eliminated by more closely matching the thermal expansion coefficient of the tube and of the contents. The final product can be suitably buried underground or at sea, preferably with other like products and packaged in a larger container for convenience.

EXAMPLE 10

Trapping Radioactive Vapors In A Porous Glass Rod

The purpose of this example is to show that gas products emanating from the simulated nuclear waste being heated in a glass tube can be trapped in a porous glass rod. 6 Gms of porous glass powder prepared as described in Example 3, was mixed in a beaker with 2.76 gms of $CsNO_3$, 3.17 gms of $Cu(NO_3)_2$, 73 ml of $H_2O$ and 25 ml of $NH_4OH$ for 20.5 hours and washed for 24 hours. The impregnated porous glass powder was dried on a hot plate at a low temperature (about 200° C. for about one hour). Then, the sample was placed in a Pyrex glass tube identical to the one described in Example 9 and having one end closed and a constricted neck located about 11 cm from the closed end. The powder formed a 4 cm high column in the tube. A 12.5 cm long porous glass rod, as prepared in Example 1A, having a diameter slightly less than 7 mm was inserted into the tube. The inner end of the rod had been ground down to a taper shape (which then was washed in a HF solution to free the pores) so that a fairly good seal was made between this end of the rod and the constricted neck section of the tube. The tube was placed upright partly inside a furnace so that the upper half of the rod was outside the furnace. Heating was carried out according to the time, temperature and pressure schedule shown in Table 3 below. At the end of the heating cycle, the tube was removed from the furnace. The bottom portions of the tube had collapsed up to 1 cm below the tapered end of the porous rod. The 5 cm section of the rod which was half inside and half outside the furnace was slightly yellow in color indicating the condensation of copper vapors, while all the other parts of the tube and the rod were substantially colorless. This indicates that the simulated radioactive vapor, i.e., copper vapors, escaping from the impregnated porous glass powder during the heating process were trapped in the approximately 5 cm section of the porous rod and prevented from leaving the tube. The resulting collapsed tube product effectively encased the simulated radwaste in a strong glass structure.

TABLE 3

| Time (Hours:Minute) | Temperature, °C. | Pressure, m Torrs |
|---|---|---|
| 2:30 | 20 | 5 |
| 2:31 | 95 | 22 |
| 2:52 | 95 | 17 |
| 3:13 | 95 | 13 |
| 3:43 | 150 | 13 |
| 4:21 | 260 | 24 |
| 9:30 | 580 | 8 |
| 10:20 | 750 | 12 |

The pressure maxima at 2:31 is due to water being expelled from the porous glass powder and the maxima at 4:21 is due to the nitrogen oxides produced by the decomposition of the cesium and copper nitrates.

EXAMPLE 11

Porous Rod in Non-Porous Tube

A porous rod having a length of 2.5 cm and a diameter of 0.7 cm and made in a manner similar to that described in Example 1A but not crushed and phase-separated and acid-leached as described in Example 2 was dried under vacuum, at room temperature, for 48 hours. The rod was then immersed (for 24 hours) in a 90° C. solution comprising 15.28 g $Fe(NO_3)_3.9H_2O$+2.16 g $Sr(NO_3)_2$+2.03 g ($Y(NO_3)_3.6H_2O$+13.61 g $Zr(NO_3)_4$+3.98 g $Cs(NO_3)$+2.67 g $Ba(NO_3)_2$+3.93 g $La(NO_3)_3.6H_2O$+8.38 g $Ce(NO_3)_3.6H_2O$+19.45 g $Nd(NO_3)_3.5H_2O$+67 ml $H_2O$. This solution simulates a projected waste stream of a nuclear reactor power plant. During the immersion, the solution diffused into the porous glass rod and filled its pores. The rod was then immediately transferred into a Pyrex test tube (nominal composition given in Example 9, 1.4 cm in O.D. and 15 cm long) containing a 110° C. solution whose composition is similar to the one mentioned above. Vacuum was then applied to the tube in order to speed up the drying of the rod by evaporating the water which was present in the solutions. After a few minutes, the nitrates were observed to have precipitated inside the rod. A small amount of the nitrates precipitated on the surface of the rod forming a thin film which was later mechanically removed. To insure the completeness of the drying, the rod was left under vacuum at 110° C. for about three hours. The dried impregnated rod was then placed under vacuum in a Vycor tube (having the nominal composition given in Example 5, 1 cm in O.D. and 50 cm long), at room temperature. The tube was then heated from room temperature to 625° C. at 15° C./hr., and from 625° C. to 890° C. at 50° C./hr. (at which latter temperature the pores of the rod collapsed).

The rod and first Vycor tube were then placed in a second Vycor tube (having the nominal composition given in Example 5, 50 cm long with a 15 mm O.D. and 12 mm I.D.) which was closed at one end. Then, the rod and tubes were placed in a furnace and heated from 450° C. to 1340° C. over a period of two hours and 26 minutes. After this time, the tube and rod assembly were taken out of the furnace. The section of the tube around the stuffed rod had collapsed on the rod as well as an approximate 1.5" section above the rod. The rod seemed to have some cracks in the rod which actually were there prior to heating, while the tube did not appear to have any cracks.

EXAMPLES 12–19

Each of the Examples 4 through 11 are repeated, except that corresponding radioactive nitrates are used in place of the corresponding non-radioactive nitrates specified in Examples 4 through 11 and radioactive by contaminated $Al_2O_3$ is used in place of non-radioactive $Al_2O_3$ specified in Example 4. In each instance, the radioactive material is immobilized and encapsulated within the resulting glass product.

EXAMPLES 20 AND 21

In Example 20, silica gel purchased from DuPont as Ludox HS-40% is poured into a Vycor glass* tube plugged with glass wool at the top opening and a porous glass disc at the bottom opening to prevent the silica gel particles from escaping. Analysis of the silica gel (Ludox HS-40%) by atomic absorption before starting shows that it contains 40 wt.% $SiO_2$, 0.41 wt.% titratable alkali as $Na_2O$, less than 0.1 wt.% $Cs_2O$, and a ratio of $SiO_2$ to $Na_2O$ of about 95 to 1. The silica gel contains about 0.4 mole percent silicon-bonded sodium oxy groups. The titratable sodium content is believed to be in the form of silicon-bonded surface sodium oxy groups and the surface to weight ratio is about 230 $m^2/g$. An essentially neutral solution containing 10 g $CsNO_3$ per 100 ml of water is passed slowly through the silica gel. After several liters are passed through, the silica gel is dried and heated in vacuum above 100° C. until the silica gel is observed to sinter (below 1000° C.) and then it is heated further with a vacuum in the Vycor tube to collapse the tube on the sintered silica gel (which normally occurs below 1300° C.). The final product, after cooling to room temperature is a solid rod with the outside surface consisting of at least 94% silica (e.g., the composition of the Vycor tube), and an interior containing Cs bonded to silicon through oxygen linkage and fused into the structure. Cesium oxide content is analyzed by atomic absorption spectroscopy to be at or above 2 weight percent based on the weight of silica gel. Sometimes the rods break into several pieces, but the immobilization and containment of the radwaste in the resultant glass product is still many times better than what is obtained by the prior art methods using cement.

*Vycor brand silica glass No. 7913 made by Corning Glass Works and containing 96 wt. % silica and 4 wt. % $B_2O_3$.

Example 21 is carried out in exactly the same manner as described above with the only exception being that the $CsNO_3$ is radioactive. There results a final product in which the radioactive Cs is chemically bonded through oxy linkages to silicon of the silica gel within the collapsed Vycor tube which effectively encapsulates and seals the radioactive Cs from the environment.

EXAMPLES 22 AND 23

Porous glass beads having an average diameter of about 50 to about 100 microns are prepared by the process described in Example 1A except that instead of pulling the molten glass into rods, it is quenched by pouring it into a cooling bath of water so as to form small fractured glass particles (frit) of varied shapes. The glass particles or frit are then formed into spheres by passing them through a radiant heating zone or high temperature flame where they soften sufficiently to permit surface tension forces to form them into spheres while they are freely moving through the air. They are then cooled rapidly to prevent deformation or devitrification. There are thus formed beads or spheres averaging about 50 to about 100 microns in diameter. These beads or spheres are treated in the manner described in Example 3 to provide porous silicate glass beads and are subjected to a primary ion exchange treatment in a 3.2M sodium nitrate-ammonium hydroxide solution for three days followed by rinsing well with deionized water until the pH of the rinse water is reduced to about 8. The beads so treated contain 2.0 wt. % silicon-bonded sodium oxy groups expressed as $Na_2O$, i.e., 4.0 mole percent sodium cations bonded to silicon through oxy linkages on the inner surfaces of the pores thereof.

An ion exchange column of Vycor glass (Example 5) is plugged with a porous glass disc at the bottom and is filled with the treated spheres or beads, i.e., the beads having the silicon-bonded sodium oxy groups. A radioactive waste stream containing undissolved radioactive solids and dissolved radioactive $Cs^+$ cations, in Example 27, or containing radioactive $Sr^{2+}$ ions, in Example 23, is passed through the column. In each case, the aqueous solution coming from the bottom of the column is substantially free of radioactive cations. After a suitable period of time to provide an adequate loading of the radioactive material on and in the pores of the beads, the waste stream is diverted to a similar column.

The loaded column is then heated by a heating zone traveling from the bottom up to first dry it, then to decompose the nitrates and drive off the nitrogen oxide decomposition products, then to close the pores of the beads, then to sinter the beads and finally to collapse the hollow Vycor column on the sintered beads to trap and encapsulate the sintered beads within the collapsed Vycor column. The radioactive cations are bound to the interior of the sintered bead mass and the undissolved radioactive solids are also trapped on the interior of the sintered bead mass as well as between the sintered bead mass and the interior collapsed Vycor column, thus providing a durable, leach-resistant glass product containing the radioactive waste materials and which is suitable for burial.

EXAMPLE 24

This example illustrates a method for treating primary coolant from a pressurized water nuclear reactor plant. A mixture of powders of silica, boric acid, sodium carbonate and potassium carbonate is prepared in such proportions that yield a glass comprising 3.5 mole percent $Na_2O$, 3.5 mole percent $K_2O$, 33 mole percent $B_2O_3$ and 60 mole percent $SiO_2$. The mixture is heated in a platinum crucible up to 1400° C. in an electric furnace to produce a molten glass which is pulled into rods about 8 mm in diameter and about 2.5 cm long. The glass rods are cooled and the glass is phase-separated by heat treating at about 550° C. for about 110 minutes. The rods are then crushed to form a powder which is sieved through a 32 mesh screen onto a 150 mesh screen. The glass particles collected on the 150 mesh screen are leached in 3N HCl at about 50° C. for about 6 hours to remove the boron-rich phase and leave behind a porous glass comprising about 95 mole percent $SiO_2$ and about 5 mole percent $B_2O_3$. The porous glass has interconnected pores and contains at least about 5 mole percent silicon-bonded hydroxyl groups. The glass particles are then rinsed in deionized water until the rinse water reaches a pH of about 7.

The porous glass powder is then immersed in an approximate 3.2 molar sodium nitrate-ammonium hydroxide aqueous solution for three days and then is rinsed in water until the pH of the rinse water is reduced to about 8. The resulting powder is then placed in an ion exchange column made of the Vycor glass as described in Example 5. A radioactive primary coolant from a pressurized water nuclear reactor plant utilizing $UO_2$ fuel clad in stainless steel (containing 4.9 weight percent $^{235}U$) is passed through the column. The primary coolant has the composition given in Table 4 below which lists the radionuclide, the probable source, the probable form and the average concentration in microcuries per milliliter. The cationic radionuclides ion-exchange with sodium cations bonded to silicon through oxy groups in the porous silicate glass powder.

TABLE 4

| Radionuclide | Probable Source[a] | Probable Form[b] | Average Concentration (μCi/ml) | Average Concentration (ppb) |
|---|---|---|---|---|
| $^{3}H$ | (1), (2) | Water, gas | 2.4 | 0.249 |
| $^{14}C$ | | | $1.2 \times 10^{-5}$ | $2.69 \times 10^{-3}$ |
| $^{24}Na$ | (1) | Cation | $1.9 \times 10^{-2}$ | $2.18 \times 10^{-6}$ |
| $^{32}P$ | | | $3.3 \times 10^{-5}$ | $1.16 \times 10^{-8}$ |
| $^{35}S$ | | | $3 \times 10^{-6}$ | $7.08 \times 10^{-8}$ |
| $^{51}Cr$ | (1) | Anion | $3.7 \times 10^{-4}$ | $4.02 \times 10^{-6}$ |
| $^{54}Mn$ | (1) | Cation, s | $2.7 \times 10^{-4}$ | $3.38 \times 10^{-5}$ |
| $^{55}Fe$ | (1) | Cation, s | $1.9 \times 10^{-4}$ | $7.6 \times 10^{-5}$ |
| $^{59}Fe$ | (1) | Cation, s | $1.0 \times 10^{-5}$ | $2.03 \times 10^{-7}$ |
| $^{57}Co$ | (1) | Cation, s | $1.2 \times 10^{-6}$ | $1.42 \times 10^{-7}$ |
| $^{58}Co$ | (1) | Cation, s | $4.7 \times 10^{-4}$ | $1.48 \times 10^{-5}$ |
| $^{60}Co$ | (1) | Cation, s | $7.7 \times 10^{-5}$ | $6.81 \times 10^{-5}$ |
| $^{63}Ni$ | (1) | Cation, s | $8.0 \times 10^{-6}$ | $1.30 \times 10^{-4}$ |
| $^{64}Cu$ | (1) | Cation, anion, s | $5.4 \times 10^{-4}$ | $1.41 \times 10^{-7}$ |
| $^{89}Sr$ | (2) | Cation | $2.8 \times 10^{-6}$ | $9.93 \times 10^{-8}$ |
| $^{90}Sr$ | (2) | Cation | $4 \times 10^{-7}$ | $2.84 \times 10^{-6}$ |
| $^{91}Sr$ | (2) | Cation | $9.8 \times 10^{-5}$ | $2.76 \times 10^{-8}$ |
| $^{90}Y$ | (2) | s | | |
| $^{91}Y$ | (2) | s | | |
| $^{92}Y$ | (2) | s | | |
| $^{95}Zr$ | (1), (2) | s | $1.7 \times 10^{-5}$ | $8.06 \times 10^{-7}$ |
| $^{95}Nb$ | (1), (2) | s | $1.9 \times 10^{-5}$ | $4.83 \times 10^{-7}$ |
| $^{99}Mo$ | (1), (2) | Anion | $1.2 \times 10^{-4}$ | $2.54 \times 10^{-7}$ |
| $^{103}Ru$ | (2) | s | 0 | |
| $^{106}Ru$ | (2) | s | 0 | |
| $^{122}Sb$ | (1) | s | $1.0 \times 10^{-4}$ | $2.62 \times 10^{-7}$ |
| $^{124}Sb$ | (1) | s | $2.0 \times 10^{-5}$ | $1.16 \times 10^{-6}$ |
| $^{132}Te$ | (2) | Anion, s | | |
| $^{131}I$ | (2) | Anion | $4.6 \times 10^{-5}$ | $3.71 \times 10^{-6}$ |
| $^{132}I$ | (2) | Anion | | |
| $^{133}I$ | (2) | Anion | $6.2 \times 10^{-4}$ | $5.5 \times 10^{-7}$ |
| $^{135}I$ | (2) | Anion | $9 \times 10^{-4}$ | $2.60 \times 10^{-7}$ |
| $^{134}Cs$ | (2) | Cation | $4.7 \times 10^{-7}$ | $3.62 \times 10^{-7}$ |
| $^{136}Cs$ | (2) | Cation | 0 | |
| $^{137}Cs$ | (2) | Cation | $1.1 \times 10^{-6}$ | $1.26 \times 10^{-5}$ |
| $^{140}Ba$ | (2) | Cation | $4.7 \times 10^{-6}$ | $6.45 \times 10^{-8}$ |
| $^{141}Ce$ | (2) | Anion, s | 0 | |
| $^{143}Ce$ | (2) | Anion, s | 0 | |
| $^{144}Ce$ | (2) | Anion, s | 0 | |
| $^{143}Pr$ | (2) | Anion, s | | |

TABLE 4-continued

| Radionuclide | Probable Source[a] | Probable Form[b] | Average Concentration ($\mu$Ci/ml) | Average Concentration (ppb) |
|---|---|---|---|---|
| $^{110m}Ag$ | (1) | s | $1.2 \times 10^{-5}$ | $2.52 \times 10^{-6}$ |
| $^{181}Hf$ | (1) | s | $6 \times 10^{-6}$ | $3.70 \times 10^{-7}$ |
| $^{182}Ta$ | (1) | s | $2.5 \times 10^{-5}$ | $4.01 \times 10^{-6}$ |
| $^{183}Ta$ | (1) | s | $6.2 \times 10^{-5}$ | $4.34 \times 10^{-7}$ |
| $^{185}W$ | (1) | s | $1.2 \times 10^{-5}$ | $1.28 \times 10^{-6}$ |
| $^{187}W$ | (1) | s | $3.7 \times 10^{-4}$ | $5.30 \times 10^{-7}$ |
| $^{85m}Kr$ | (2) | Gas | | |
| $^{85}Kr$ | (2) | Gas | | |
| $^{88}Kr$ | (2) | Gas | | |
| $^{133}Xe$ | (2) | Gas | $8.9 \times 10^{-5}$ | $4.78 \times 10^{-8}$ |
| $^{135}Xe$ | (2) | Gas | $9 \times 10^{-5}$ | $3.54 \times 10^{-8}$ |

[a](1) Neutron activation products of nuclides from fuel cladding, construction material, and water.
(2) Leakage from fuel. Mostly fission products.
[b]Gas: presumably as dissolved gas.
s: insoluble solids.

The radioactive cations of the radionuclides listed in Table 4, cation-exchange with sodium cations bonded to silicon through oxy groups in the porous glass thereby binding the radionuclides to the porous glass through said silicon-bonded oxy groups and releasing non-radioactive sodium cations to the coolant solution. The insoluble radioactive solids in the coolant also filter out on the external surfaces of the porous glass particles. Additional porous glass particles can be added to increase the filtering capacity of the ion exchange column as the insoluble solids build-up on the column.

The anionic radionuclides are not substantially removed in the column and pass with the coolant through the column. The anionic radionuclides can be subsequently removed by reatment with conventional anion exchange resins. Upon regeneration of the conventional anion exchange resin after it becomes loaded, the regenerant solution containing the anionic radionuclides can be concentrated by evaporation and the resulting concentrate can be molecularly stuffed pursuant to the procedures described in U.S. Pat. No. 4,110,096 into the pores of the porous glass in the ion exchange column after said porous glass had become substantially loaded with silicon-bonded radionuclide cation oxy groups. It is preferred to first dry the loaded porous glass so that the anionic radionuclide concentrate can readily enter the pores of the porous glass. The anionic radionuclides can be precipitated or deposited within the pores of the porous glass by the careful drying procedures disclosed in U.S. Pat. No. 4,110,096. Thereafter, columns containing the porous glass particles can be heated to drive off volatiles, to decompose decomposables and drive off non-radioactive decomposition products, to collapse the pores of the particles and sinter same into a unitary mass and to collapse the Vycor glass column around the sintered mass thereby enveloping the filtered solids and the sintered mass glass particles containing the cationic and anionic radinuclides within the collapsed Vycor glass column. While the glass column cracks because of differential thermal contraction it still contains and further immobilizes the radioactive materials and forms a product that is many times more durable than cement or metal drum presently in use. There is thus provided a durable package of concentrated radionuclides which is highly resistant to leaching by water or other fluids.

As illustrated in Example 24, liquid treatment that must be satisfactorily treated and disposed of can be highly dilute. The volume of dilute radwaste treated with a given amount of ion exchange porous glass pursuant to Example 24 can be practically unlimited before all the available exchange sites (i.e. silicon-bonded sodium oxy groups) in the porous silicate glass are filled by radioactive cations. For example, the weight of the dilute liquid radwaste described in Example 24 that could be expected to be treated before exhausting all exchange sites would be of the order of $10^9$ or more times the weight of the ion exchange porous glass employed. Furthermore, it could be expected that other parts of the system would require overhaul, e.g., repair or replacement of pumps or piping or other equipment, before the ion exchange silicate glass becomes exhausted. Consequently, it is quite possible, if not probable, that the radioactivity of the resulting porous glass when sintered for storage may never reach 1 millicurie or even 1 microcurie per cc. of the glass. In the absence of malfunction requiring overhaul of the other parts of the radwaste treatment system, 100 or less to $10^9$ or more, preferably 100 to $10^6$, weight parts of radwaste can be treated for each weight part of porous silicate glass within the Vycor tube ion exchange column.

EXAMPLE 25

Use of Porous Powder in Non-Porous Tube to Encapsulate

A non-radioactive nitrate mixture was used to simulate the United Kingdom UKM-22 commercial waste whose composition is reported in terms of oxides in Table 5. Various amounts of nitrates were mixed together in such a proportion as to yield the appropriate oxide concentrations given in Table 5. Appropriate amounts of nitrates whose total weight corresponds to a total of 2 g oxides were placed in a 250 ml beaker; 20 ml $H_2O$ was added; the solution was stirred and heated up slowly to 80° C. at which temperature a light brown solution containing some undissolved salts was obtained. 18 g of porous glass prepared as in Example 3 was then added to the solution as to give a 10% loading of waste oxides with respect to the final glass. The volume ratio of solution to glass powder was close to 1:1. The mixture was dried at 90° C. Approximately 3 g of the dry mixture was heated under vacuum in a Vycor tube similar to the one described in Example 5 according to the following schedule:

| Time (hour:minute) | T (°C.) | Pressure, m Torrs |
|---|---|---|
| 9:45 AM | 25 | 25 |
| 10:15 AM | 65 | 30 |
| 11:15 AM | 278 | 26 |
| 11:30 AM | 342 | 38 |
| 11:40 AM | 383 | 32 |
| 11:50 PM | 403 | 68 |

-continued

| Time (hour:minute) | T (°C.) | Pressure, m Torrs |
|---|---|---|
| 12:05 PM | 520 | 44 |
| 3:20 PM | 1300 | 36 |
| 3:45 PM | 1310 | 16 |
| 4:15 PM | 1310 | 16 |

The finished glass product showed that the pores of the powder and the grains inside the tube were well sintered. In addition, the tube was completely collapsed but cracked during air quenching. The finished product was powdered to increase its surface area and was subjected to a leaching test at pH 5.6 and at 70° C. for various exposure times. The results as reported in Table 6 show that the glass sample possesses an excellent chemical durability.

TABLE 5

United Kingdom UKM-22 composition.

| Oxide | Reported wt % | Simulated wt % | Oxide | Reported wt % | Simulated wt % |
|---|---|---|---|---|---|
| $Al_2O_3$ | 19.89 | 19.89 | $ZrO_2$ | 5.57 | 5.57 |
| $Rb_2O$ | 0.43 | 0.43 | $PO_4$ | 0.93 | 0.93 |
| $Cs_2O$ | 3.00 | 3.00 | $Cr_2O_3$ | 2.18 | 2.18 |
| MgO | 24.68 | 24.68 | $MoO_3$ | 6.89 | 6.89 |
| SrO | 1.25 | 1.25 | $Fe_2O_3$ | 10.63 | 10.63 |
| BaO | 1.48 | 1.48 | $RuO_2$ | 2.65 | 2.65 |
| $Y_2O_3$ | 0.66 | 0.66 | $NiO_2$ | 1.40 | 1.40 |
| $La_2O_3$ | 1.71 | 1.71 | PdO | 1.71 | 1.71 |
| $Pr_6O_{11}$ | 1.67 | — | ZnO | 1.71 | 1.71 |
| $Nd_2O_3$ | 7.08 | 7.08 | $U_3O_8$ | 0.23 | Replaced by $CeO_2$ |
| $CeO_2$ | 3.85 | 3.85 | $SO_4$ | 0.39 | 0.39 |

TABLE 6

Chemical Durability Of Product Obtained In Example 25 In Deionized Water Having An Initial pH of 5.6*

| Sample | Glass Component and Leach Rate** | | | | | |
|---|---|---|---|---|---|---|
| | $SiO_2$ | Ln*** | Fe | Na | Cs | Sr |
| Core and Clad Powered | 295 | 32 | <1 | <4 | <20 | <1 |
| Core Powered | 127 | 42 | 11 | 17 | 3 | 8 |

*Data taken between Day 12 and Day 15, 70° C., 71 hrs.
**Leach rates are in ng of waste dissolved per $cm^2$ of surface area of powdered product per day.
***Includes all lanthanites.

The leach rates reported in Tables 7 and 9 below have been normalized by the amount of the component present in the glass. Thus, they represent the leach rate the glass would have if the measurement was made only on that component. The glass is dissolving at the silica leach rate. The sodium, strontium and cesium diffuse to the surface and are initially leached at a faster rate. Iron and lanthanites concentrate at the surface. Eventually, the whole glass will leach at the silica rate.

EXAMPLE 26

Use Of Porous Powder In Non-Porous Tube To Encapsulate

A non-radioactive nitrate mixture similar to the one described in Example 25 to simulate the UKM-22 waste was prepared. However, in the preparation of this nitrate mixture, $Zr(NO_3)_4$ and $K_2MoO_4$ was dissolved separately from the other nitrates with sufficient amount of concentrated $HNO_3$, the others being dissolved in a $3MHNO_3$ solution or in water. The two solutions were then mixed together and no precipitate was observed. Phosphoric acid and sulfuric acid were subsequently added to the solution to yield appropriate amounts of $PO_4^{\equiv}$ and $SO_4^{=}$. A white gelatinous precipitate appeared and did not dissolve upon heating up to 70° C. About 50% of the nitrates precipitated out when the solution was evaporated down to about 15 ml. Eight grams of porous glass prepared as in Example 3 were then added to the solution to give a 20% loading of waste oxides with respect to the final glass. The volume ratio of solution to glass powder was about 1:1. The mixture was dried at 90° C. for about 16 hrs. Approximately 3 g of the dry mixture was placed under vacuum in a Vycor tube having an outside diameter of 13 mm and a wall thickness of 1.5 mm. The mixture was heated to 600° C. at 50° C./hr. After holding at 600° C. for 48 hrs, the tube was subjected to a temperature jump to 1240° C. where the pores and the grains inside the tube were well sintered. The tube, however, did not collapse and bubbles were formed in the waste-glass matrix. Moreover, the tube cracked during air quenching. Leaching tests were performed on the core of the sample. The results reported in Table 7 show that it has an excellent chemical durability.

TABLE 7

Chemical Durability Of Product Obtained In Example 26 In Deionized Water Having An Initial pH of 5.6*

| Time (Days) | Glass Component and Leach Rate** | | | | | |
|---|---|---|---|---|---|---|
| | $SiO_2$ | Fe | Ln*** | Na | Sr | Cs |
| 0.34 | 6,190 | 1150 | 737 | $3.61 \times 10^5$ | 3,260 | <1000 |
| 1.3 | 963 | 120 | 344 | <2,500 | 6,340 | 300 |
| 2.2 | 550 | 30 | 400 | <2,500 | 2,200 | <300 |
| 3.3 | 370 | 49 | 550 | <2,500 | 2,300 | 1,400 |
| 5.7 | 200 | 12 | <80 | <2,500 | 1,400 | 120 |
| 9.3 | 260 | <13 | 50 | <2,500 | 680 | <320 |
| 12.2 | 220 | 3 | 210 | <2,500 | 1,900 | 150 |
| 15.2 | 230 | <13 | 56 | — | 2,000 | <320 |

*Data taken at 70° C.
**Leach rates are in ng of waste dissolved per $cm^2$ of surface area of powdered product per day.
***Includes all lanthanites.

EXAMPLE 27

Use of Porous Powder In Ion-Exchanged Tube To Encapsulate

A mixture containing non-radioactive nitrates and porous glass was prepared as in Example 26 but with only 5% loading of oxides with respect to the final glass. Approximately 3 g of the dry mixture was introduced in an ion-exchanged tube which was prepared as follows: an opened porous tube having an outside diameter of 10 mm, a wall thickness of ~1 mm and a length of 20 cm was prepared as in Example 2. The porous tube was then soaked in a solution containing 200 ppm Cs with enough $NH_4OH$ to give a pH of 10 for 18 hrs, and washed in room temperature water until a pH of 7 was obtained. The Cs exchanged tube was subsequently dried under vacuum and was heated from room temperature to 600° C. at 15° C./hr and from 600° C. to 870° C. at 50° C./hr to collapse the pores. One end of the tube was then sealed using a torch prior to the introduction of the mixture of simulated wastes and porous glass. The mixture was then heated under vacuum in the tube according to the following schedule:

| Time (hour:minute) | T(°C.) | Pressure, m Torrs |
|---|---|---|
| 11:00 AM | 22 | 15 |
| 11:20 AM | 180 | 100 |
| 11:25 AM | 200 | 100 |
| 11:35 AM | 252 | 50 |
| 12:02 PM | 330 | 48 |
| 12:10 PM | 470 | 36 |
| 12:53 PM | 547 | 28 |
| 1:00 PM | 775 | 25 |
| 1:20 PM | 875 | 24 |
| 1:30 PM | 927 | 24 |
| 1:35 PM | 1010 | 24 |
| 1:47 PM | 1075 | 24 |
| 2:00 PM | 1100 | 24 |

The finished glass article showed that the collapsing of the tube was complete and there were no cracks. The grains inside the tube, however, did not completely sinter. Here the thermal expansion coefficients of the tube and powder were matched. However, complete sintering was not achieved because the collapsing temperature of the tube (about 1100° C.) was too low for the nuclear waste composition and loading level utilized.

The composition of the ion exchange tube was measured to be 0.5 weight percent Cs.

EXAMPLE 28

Use of Porous Powder In Non-Porous Tube To Encapsulate

A non-radioactive nitrate mixture was used to simulate the West-Valley PW-8*a* waste whose composition is reported in terms of oxides in Table 8. Various amounts of nitrates were first dissolved separately in 3M $HNO_3$ or in water and then were mixed in such a proportion as to yield the appropriate oxide concentrations given in Table 8. A solution containing appropriate amounts of nitrates plus some undissolved salts whose total weight corresponds to a total of 4 g oxides was evaporated down to near dryness and was then mixed with 16 g of porous glass prepared as in Example 3 as to yield a loading of 20% waste oxides with respect to the final glass. The mixture was subsequently dried at 90° C. Approximately 3 g of the dry mixture was heated under vacuum in a Vycor tube similar to the one described in Example 5. The mixture was heated to 600° C. then was subjected to a temperature jump to about 1250° C. at which temperature the waste porous glass mixture sintered completely. The Vycor tube did not fully collapse and cracked during air quenching. Leaching tests were performed on the core of the sample. The results reported in Table 9 show that it has an excellent chemical durability.

TABLE 8

| | West-Valley PW-8a Composition | | | | |
|---|---|---|---|---|---|
| Oxide | Reported wt % | Simulated wt % | Oxide | Reported wt % | Simulated wt % |
| $Na_2O$ | 16.62 | 16.62 | $TeO_2$ | 0.86 | — |
| $Fe_2O_3$ | 34.29 | 34.29 | $Cs_2O$ | 1.14 | 1.14 |
| $Cr_2O_3$ | 1.36 | 1.36 | BaO | 1.85 | 1.85 |
| NiO | 1.74 | 1.74 | $Y_2O_3$ | 0.05 | 0.05 |
| $P_2O_5$ | 1.58 | 1.58 | $La_2O_3$ | 6.05 | 6.05 |
| $Rb_2O$ | 0.21 | 0.21 | $CeO_2$ | 12.09 | 12.09 |
| SrO | 1.25 | 1.25 | $Pr_6O_{11}$ | 1.06 | 1.06 |
| $ZrO_2$ | 5.84 | 5.84 | $Nd_2O_3$ | 3.62 | 3.62 |
| $MoO_3$ | 7.54 | 7.54 | $Sm_2O_3$ | 0.64 | 0.64 |
| $Rh_2O_3$ | 0.36 | 0.36 | $Eu_2O_3$ | 0.17 | 0.17 |
| $Ag_2O$ | 0.104 | 0.104 | $Gd_2O_3$ | 0.43 | 0.43 |

TABLE 8-continued

| | West-Valley PW-8a Composition | | | | |
|---|---|---|---|---|---|
| Oxide | Reported wt % | Simulated wt % | Oxide | Reported wt % | Simulated wt % |
| CdO | 0.15 | 0.51 | | | |

TABLE 9

Chemical Durability Of Product Obtained In Example 28 In Deionized Water Having An Initial pH of 5.6*

| | Glass Component and Leach Rate** | | | | | |
|---|---|---|---|---|---|---|
| Time (Days) | $SiO_2$ | Fe | Ln*** | Na | Sr | Cs |
| 0.34 | 2800 | 62 | <32 | 6500 | 560 | 223 |
| 1.3 | 905 | 8 | 370 | 2500 | 2000 | <630 |
| 2.2 | 550 | 25 | 440 | 1400 | 240 | 370 |
| 3.25 | 430 | 12 | 440 | 1360 | 1200 | 670 |
| 5.7 | 200 | 100 | 150 | 870 | 880 | 340 |
| 9.3 | 280 | <25 | 150 | 780 | 600 | 630 |
| 12.2 | 313 | <1 | 200 | 780 | 780 | 770 |
| 15.2 | 300 | 3 | 120 | 840 | — | 620 |

*Data taken at 70° C.
**Leach rates are in ng of waste dissolved per $cm^2$ of surface area of powdered product per day.
***Includes all lanthanites.

EXAMPLE 29

Use Of Porous Powder In Ion-Exchanged Tube To Encapsulate

The porous powder mixed with nuclear waste described in Example 28 was used in a tube made according to Example 27. The mixture was heated in vacuum to 600° C. then subjected to a temperature jump to about 1100° C. at which temperature the waste porous glass mixture sintered completely. The ion exchanged tube did collapse completely. However, it cracked during air quenching. Upon examination of the core material it was found that it had been completely sintered and that it was a good quality glass. Thus, by increasing the loading level of nuclear waste from Example 27, we were able to lower the sintering temperature to below the collapsing temperature of the ion exchanged tube. However, we put an excessive amount of nuclear waste in this experiment and the expansion coefficient was slightly too high causing a small number of cracks.

To achieve a completely sintered uncracked product with ion exchanged tubes used in Example 27 and 29, intermediate loading levels should be used. For example, loading levels between 8 and 12%.

What is claimed is:

1. Method of making a glass article starting with a porous glass preform comprising immersing said preform in a solution having a pH between 9 and 13.5 comprising ammonium hydroxide and at least one dopant selected from the group consisting of cesium, rubidium, strontium, and copper, and drying and heating to collapse the pores of the preform to form a highly durable glass article comprising more than 86 mole % $SiO_2$ and between 0.5 and 6 mole % dopant oxide.

2. Method according to claim 1 wherein the article is a glass container.

3. The method of claim 2, wherein said dopant oxide is selected from the group consisting of cesium, rubidium, mixtures thereof, and mixtures of cesium or rubidium with strontium and/or copper, and 0 to 8% $B_2O_3$, said glass container having a high chemical durability to water.

4. The method of claim 3, wherein said dopant is cesium.

5. The method of claim 3, wherein said dopant is rubidium.

6. The method of claim 3, wherein said dopant is a mixture of cesium and strontium.

7. A method of varying the thermal expansion coefficient of a glass container to make it suitable for use in the storage of radioactive nuclear waste by introducing and varying a dopant concentration in its structure which comprises impregnating a hollow porous borosilicate glass container with a liquid solution of dopant having a pH of between 9 and 13.5, said glass container being characterized by an interconnecting porous structure and ≡SiOH groups on its surface, causing the cation moiety of said dopant to undergo ion exchange with the proton of the ≡SiOH group, removing liquid from said glass container and collapsing its porous structure while maintaining the shape of the container.

8. A method as claimed in claim 7 wherein the dopant is at least one member selected from the group consisting of cesium, rubidium, strontium, and copper.

9. Method according to claim 7 wherein the pH of said solution lies between about 10 and 13.

10. Method according to claim 7 wherein the dopant is cesium.

11. Method according to claim 7 wherein the dopant is rubidium.

* * * * *